(12) United States Patent
Hu et al.

(10) Patent No.: US 11,716,468 B2
(45) Date of Patent: Aug. 1, 2023

(54) ADAPTIVE LOOP FILTER SIGNALING REDUNDANCY REMOVAL FIELD

(71) Applicant: Qualcomm Incorporated, San Diego, CA (US)

(72) Inventors: Nan Hu, San Diego, CA (US); Vadim Seregin, San Diego, CA (US); Marta Karczewicz, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 0 days.

(21) Appl. No.: 17/128,005

(22) Filed: Dec. 19, 2020

(65) Prior Publication Data

US 2021/0195183 A1 Jun. 24, 2021

Related U.S. Application Data

(60) Provisional application No. 62/952,210, filed on Dec. 20, 2019.

(51) Int. Cl.
| | |
|---|---|
| *H04N 19/117* | (2014.01) |
| *H04N 19/82* | (2014.01) |
| *H04N 19/176* | (2014.01) |
| *H04N 19/186* | (2014.01) |
| *H04N 19/46* | (2014.01) |

(52) U.S. Cl.
CPC ......... *H04N 19/117* (2014.11); *H04N 19/176* (2014.11); *H04N 19/186* (2014.11); *H04N 19/46* (2014.11); *H04N 19/82* (2014.11)

(58) Field of Classification Search
CPC .. H04N 19/117; H04N 19/176; H04N 19/186; H04N 19/46; H04N 19/70; H04N 19/82
See application file for complete search history.

(56) References Cited

U.S. PATENT DOCUMENTS

| | | | |
|---|---|---|---|
| 2013/0235926 A1* | 9/2013 | Wan | H04N 19/46 375/240.02 |
| 2018/0063527 A1* | 3/2018 | Chen | H04N 19/124 |
| 2020/0036974 A1* | 1/2020 | Kanoh | H04N 19/86 |
| 2020/0059642 A1* | 2/2020 | Kang | H04N 19/70 |
| 2022/0030220 A1* | 1/2022 | Deng | H04N 19/146 |

* cited by examiner

*Primary Examiner* — Md N Haque
(74) *Attorney, Agent, or Firm* — Espartaco Diaz Hidalgo

(57) ABSTRACT

A device capable of compressing video data includes a memory configured to store a luma new filter value, a chroma new filter value, a cross component Cb new filter value, and a cross component Cr new filter value. The device may also include one or more processors, coupled to the memory, configured to set a joint constraint on the luma new filter value, the chroma new filter value, the cross component Cb new filter value, and the cross component Cr new filter value, such that each of the luma new filter value, the chroma new filter value, the cross component Cb new filter value, and the cross component Cr new filter value are not disabled in a unit associated with an adaptation parameter set having a first adaptation parameter set identification (APS ID).

18 Claims, 18 Drawing Sheets

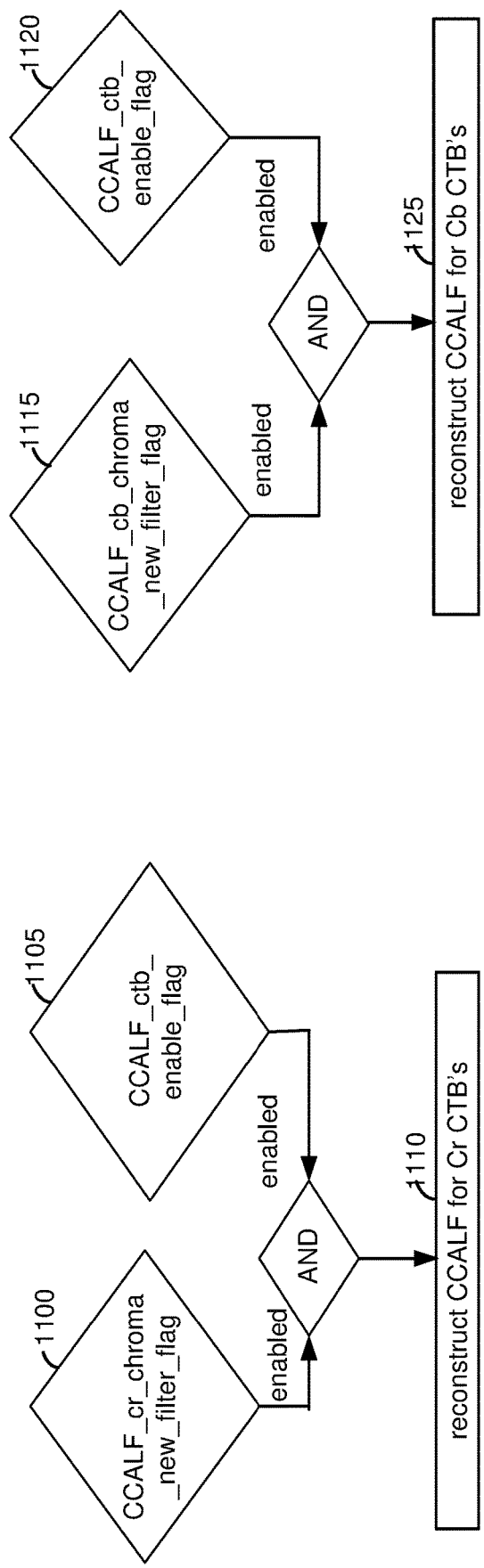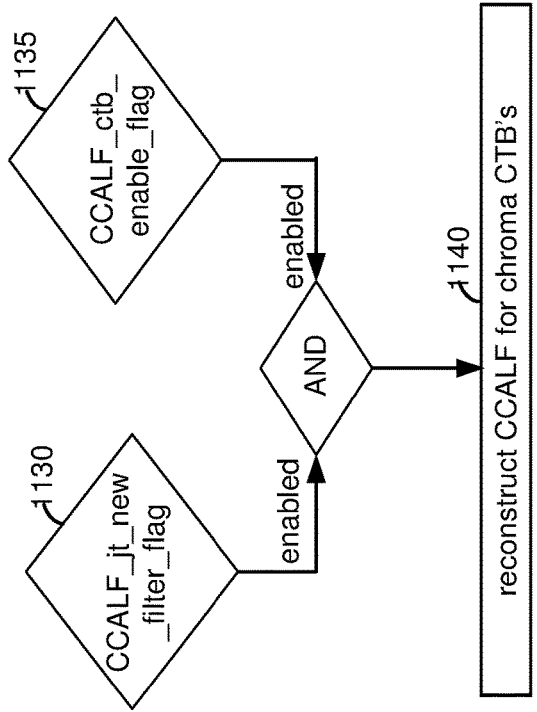
FIG. 11A decoder
FIG. 11B decoder
FIG. 11C decoder

ADAPTIVE LOOP FILTER SIGNALING REDUNDANCY REMOVAL FIELD

CROSS REFERENCE TO RELATED APPLICATIONS

This application claims priority to and benefit of U.S. Provisional Patent Application No. 62/952,210, entitled ADAPTIVE LOOP FILTER SIGNALING REDUNDANCY REMOVAL", filed Dec. 20, 2019, the entire contents of which are incorporated herein by reference.

FIELD

This disclosure relates to devices for video coding, more specifically to adaptive loop filter signaling redundancy removal.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques may include filtering techniques that can enhance the quality of a decoded video signal. The filtering techniques can be applied post-filter, where filtered frames are not used for prediction of future frames, and/or can be applied in-loop, where the filtered frames are available to be used to predict future frames.

SUMMARY

In general, the techniques of this disclosure are related to improvements to filtering techniques in video coding. More specifically, the techniques are related to improvements to Adaptive Loop Filter (ALF) signaling redundancy removal. For example, one technique may include a method of encoding video data comprising associating a luma new filter value, with a plurality of luma filters, in an adaptation parameter set, wherein the luma new filter value indicates whether at least one luma filter is present in an adaptive parameter set (APS). The method may further include associating a chroma new filter value, with a plurality of chroma filters, in the adaptation parameter set, wherein the chroma new filter value indicates whether at least one chroma filter is present in the APS. In addition, the method may include associating a cross component Cb new filter value, with a plurality of chroma component Cb chroma filters, in the adaptation parameter set, wherein the cross component Cb new filter value indicates whether at least one cross component Cb filter is present in the APS. The method may further include associating a cross component Cr new filter value, with a plurality of chroma component Cr chroma filters, in the adaptation parameter set, wherein the cross component Cr new filter value indicates whether at least one cross component Cr filter is present in the APS. Moreover, the method may also include setting a joint constraint, on the luma new filter value, the chroma new filter value, the cross component Cb new filter value, and the cross component Cr new filter value, such that each of the luma new filter value, the chroma new filter value, the cross component Cb new filter value, and the cross component Cr new filter value are not disabled in a unit associated with an adaptation parameter set having a first adaptation parameter set identification (APS ID), and generating a bitstream, within a video frame, that includes the luma new filter value, the chroma new filter value, the cross component Cb new filter value, and cross component Cr new filter value in the unit associated with the adaptation parameter based on the joint constraint.

In addition, there may be a device capable of compressing video data that includes a memory configured to store a luma new filter value, a chroma new filter value, a cross component Cb new filter value, and a cross component Cr new filter value. The device may also include one or more processors are configured to associate a luma new filter value, with a plurality of luma filters, in an adaptation parameter set, wherein the luma new filter value indicates whether at least one luma filter is present in an adaptive parameter set (APS). The one or more processors may also be configured to associate a chroma new filter value, with a plurality of chroma filters, in the adaptation parameter set, wherein the chroma new filter value indicates whether at least one chroma filter is present in the APS. In addition, the one or more processors may be configured to associate a cross component Cb new filter value, with a plurality of chroma component Cb chroma filters, in the adaptation parameter set, wherein the cross component Cb new filter value indicates whether at least one cross component Cb filter is present in the APS. The one or more processors may be also configured to associate a cross component Cr new filter value, with a plurality of chroma component Cr chroma filters, in the adaptation parameter set, wherein the cross component Cr new filter value indicates whether at least one cross component Cr filter is present in the APS. Moreover, the one or more processors may be configured to set a joint constraint on the luma new filter value, the chroma new filter value, the cross component Cb new filter value, and the cross component Cr new filter value, such that each of the luma new filter value, the chroma new filter value, the cross component Cb new filter value, and the cross component Cr new filter value are not disabled in a unit associated with an adaptation parameter set having a first adaptation parameter set identification (APS ID), and generate a bitstream that includes the luma new filter value, the chroma new filter value, the cross component Cb new filter value, and cross component Cr new filter value in the unit associated with the adaptation parameter based on the joint constraint.

There also may be device capable of decompressing compressed video data. The device may include a memory configured to store compressed video data. The device may also include one or more processors, coupled to the memory, configured to receive a bitstream that includes a luma new filter value, a chroma new filter value, a cross component Cb chroma new filter value, a cross component Cr chroma new filter value, the compressed video data. The luma new filter value, the chroma new filter value, the cross component Cb chroma new filter value, the cross component Cr chroma new filter value having been transmitted subject to a joint constraint that not all of the luma new filter value, the chroma new filter value, the cross component Cb chroma new filter value, the cross component Cr chroma new filter value are equal to disabled in a bitstream within a same frame.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 11A is a flowchart that illustrates a process that may be performed by a video decoder device according to the techniques described in this disclosure.

FIG. 11B is a flowchart that illustrates a process that may be performed by a video decoder device according to the techniques described in this disclosure.

FIG. 11C is a flowchart that illustrates a process that may be performed by a video decoder device according to the techniques described in this disclosure including techniques relating to joint chroma filters.

DETAILED DESCRIPTION

In general, the techniques of this disclosure are related to improvements to Adaptive Loop Filter (ALF) signaling redundancy removal.

The techniques of this disclosure may be applied to any existing video codec, such as those conforming to ITU-T H.264/AVC (Advanced Video Coding) or High Efficiency Video Coding (HEVC), also referred to as ITU-T H.265. H.264 is described in International Telecommunication Union, "Advanced video coding for generic audiovisual services," SERIES H: AUDIOVISUAL AND MULTIMEDIA SYSTEMS, Infrastructure of audiovisual services—Coding of moving video, H.264, June 2011, and H.265 is described in International Telecommunication Union, "High efficiency video coding," SERIES H: AUDIOVISUAL AND MULTIMEDIA SYSTEMS, Infrastructure of audiovisual services—Coding of moving video, April 2015. The techniques of this disclosure may also be applied to any other previous, current, or future video coding standards as an efficient coding tool.

Other video coding standards include ITU-T H.261, ISO/IEC MPEG-1 Visual, ITU-T H.262 or ISO/IEC MPEG-2 Visual, ITU-T H.263, ISO/IEC MPEG-4 Visual and the Scalable Video Coding (SVC) and Multiview Video Coding (MVC) extensions of H.264, as well as the extensions of HEVC, such as the range extension, multiview extension (MV-HEVC) and scalable extension (SHVC).

There currently exists a need for standardization of video coding technology with a compression capability that exceeds that of the HEVC standard (including its current extensions).

Certain techniques of this disclosure may be described with reference to H.264 and/or HEVC to aid in understanding, but the techniques describe are not limited to H.264 or HEVC and can be used in conjunction with other coding standards and other coding tools.

Figure 1:
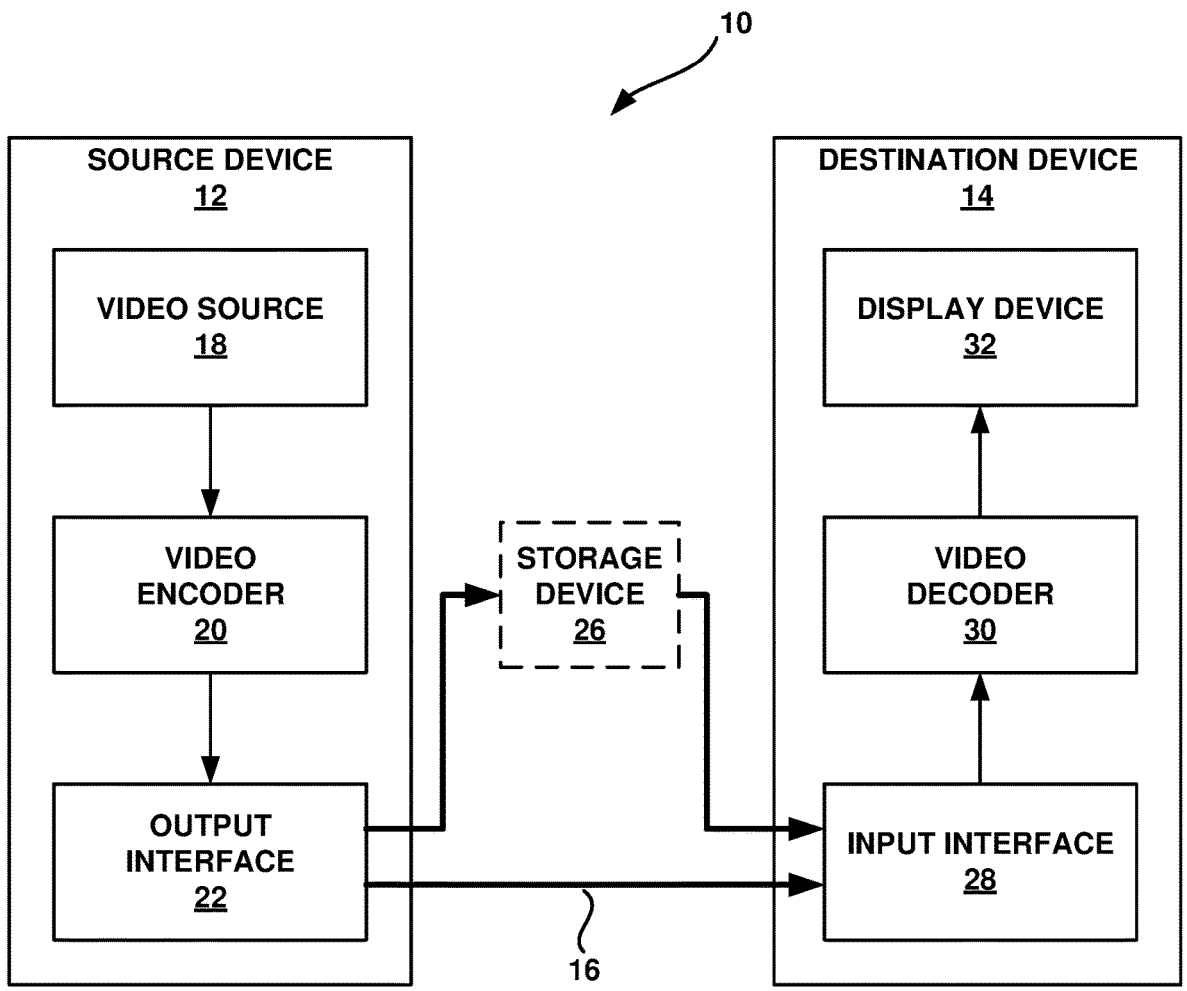
FIG. 1 is a block diagram illustrating an example video encoding and decoding system that may utilize the techniques described in this disclosure.

FIG. 1 is a block diagram illustrating an example video encoding and decoding system 10 that may utilize the techniques for adaptive loop filtering signaling described in this disclosure. As shown in FIG. 1, system 10 includes a source device 12 that generates encoded video data to be decoded at a later time by a destination device 14. Source device 12 and destination device 14 may be any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, head-mounted displays (HMDs), wearable technology devices (e.g., so-called "smart" watches), or the like. In some cases, source device 12 and destination device 14 may be equipped for wireless communication.

Destination device 14 may receive the encoded video data to be decoded via a link 16. Link 16 may be any type of medium or device capable of moving the encoded video data from source device 12 to destination device 14. In one example, link 16 may be a communication medium to enable source device 12 to transmit encoded video data directly to destination device 14 in real-time. The encoded video data may be modulated according to a communication standard, such as a wireless communication protocol, and transmitted to destination device 14. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded video data may be output from output interface 22 to a storage device 26. Similarly, encoded video data may be accessed from storage device 26 by input interface 28. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless connection (e.g., a Wi-Fi connection), a wired connection (e.g., DSL, cable modem, etc.), or a combination of both, that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, a video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. In general, capturing video data may include any technique for recording, generating, and/or sensing video data. As one example, if video source 18 is a video camera, source device 12 and destination device 14 may form so-called camera phones or video phones. However, the techniques described in this disclosure may be applicable to video coding in general and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 can receive the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored on a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user and may be any of a variety of display devices such as a liquid crystal display (LCD), a plasma display, an organic light emitting diode (OLED) display, or another type of display device.

Video encoder 20 and video decoder 30 may operate according to a video compression standard.

ITU-T VCEG (Q6/16) and ISO/IEC MPEG (JTC 1/SC 29/WG 11) are now developing future video coding technology with a compression capability that potentially exceeds that of the current HEVC standard (including its current extensions and near-term extensions for screen content coding and high-dynamic-range coding). The new standard is called H.266/VVC (Versatile Video coding). The groups are working together on this exploration activity in a joint collaboration effort known as the Joint Video Exploration Team (JVET) to evaluate compression technology designs.

The techniques of this disclosure, however, are not limited to any particular coding standard.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

This disclosure describes techniques related to filtering operations which could be used in a post-processing stage, as part of in-loop coding, or in the prediction stage of video coding. The techniques of this disclosure may be implemented into existing video codecs, such as HEVC, or be an efficient coding tool for a future video coding standard, such as the H.266/VVC standard presently under development.

Video coding typically involves predicting a block of video data from either an already coded block of video data in the same picture (e.g., intra prediction) or an already coded block of video data in a different picture (e.g., inter prediction). In some instances, the video encoder 20 also calculates residual data by comparing the predictive block to the original block. Thus, the residual data represents a difference between the predictive block and the original block.

Video encoder 20 transforms and quantizes the residual data and signals the transformed and quantized residual data in the encoded bitstream. Video decoder 30 adds the residual data to the predictive block to produce a reconstructed video block that matches the original video block more closely than the predictive block alone. To further improve the quality of decoded video, video encoder 20 and video decoder 30 can perform one or more filtering operations on the reconstructed video blocks. Examples of these filtering operations include deblocking filtering, sample adaptive offset (SAO) filtering, and adaptive loop filtering (ALF). As used herein ALF, can refer to the process of adaptive loop filtering and/or the adaptive loop filter itself. Parameters for these filtering operations may be determined by video encoder 20 and explicitly signaled in the encoded video bitstream or may be implicitly determined by video decoder 30 without needing the parameters to be explicitly signaled in the encoded video bitstream.

This disclosure describes techniques related to ALF. An ALF may be used in a post-processing stage, for in-loop coding, or in a prediction process. ALF may be applied to any of various existing video codec technologies, such as HEVC-compliant codec technology, or be an efficient coding tool in any future video coding standards.

As used in this disclosure, the term video coding generically refers to either video encoding or video decoding. Similarly, the term video coder may generically refer to a video encoder or a video decoder. Moreover, certain techniques described in this disclosure with respect to video decoding may also apply to video encoding, and vice versa. For example, often times video encoders and video decoders are configured to perform the same process, or reciprocal processes. Also, video encoder 20 typically performs video decoding as part of the processes of determining how to encode video data.

As will be explained in more detail below, in accordance with the techniques of this disclosure video encoder 20 and video decoder 30 may be configured to utilize adaptive parameter sets (APSs) to signal information associated with adaptive loop filters (e.g., ALF parameters, such as ALF coefficients). Various techniques are described below for efficiently encoding ALF information and decoding ALF information using APSs, thus improving coding efficiency and/or picture quality.

In HEVC, VVC, and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). In some embodiments, CTUs can be further divided into coding tree blocks (CTBs) (e.g., the two-dimensional arrays of luma, Cb chrominance, and Cr chrominance samples)). In additional embodiments, CTBs can be further divided into coding units (CUs).

In further embodiments, video encoder 20 may additionally or alternatively generate a set of tiles of a picture. A tile may include one or more CTUs of a picture. A tile may define vertical and/or horizontal lines that divide the picture (e.g., into rectangles). The components of a tile (e.g., CTUs) can be decoded in raster scan order inside each tile and the tiles can be decoded in the raster scan order inside a picture. The tiles may affect the availability of the neighboring CTUs, CTBs, or CUs for prediction and may or may not include resetting any entropy coding.

In still further embodiments, video encoder 20 may further segment a tile into slices. In some instances, the slices are designed to be independently decodable, enabling parallel processing.

Each of the CTUs may include a CTB of luma samples, two corresponding CTBs of chroma samples, and syntax structures used to code the samples of the CTBs. In monochrome pictures or pictures having three separate color planes, a CTU may include a single CTB and syntax structures used to code the samples of the CTB. A CTB may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs. A slice may include an integer number of CTUs ordered consecutively in a raster scan order.

In one example, to generate a coded CTU, video encoder 20 may recursively perform quad-tree partitioning on the CTBs of a CTU to divide the CTBs into coding blocks, hence the name "coding tree units." A coding block may be an N×N block of samples. A CU may include a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may include a single coding block and syntax structures used to code the samples of the coding block.

Video encoder 20 may partition a coding block of a CU into one or more prediction blocks. A prediction block is a rectangular (i.e., square, or non-square) block of samples on which the same prediction is applied. A subblock may be a prediction block of luma samples. In monochrome pictures or pictures having three separate color planes, a subblock may be a single prediction block and syntax structures used to predict the prediction block. The video encoder 20 may generate predictive luma, Cb, and Cr blocks for luma, Cb, and Cr prediction blocks of each subblock of the CU.

As another example, video encoder 20 and video decoder 30 may be configured to operate according to JEM or VVC. According to JEM or VVC, a video coder (such as video encoder 20) partitions a picture into a plurality of coding tree units (CTUs). Video encoder 20 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs (transform units) of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 20 and video decoder 30 may use a single QTBT or MTT structure to represent each of the luminance and chrominance components, while in other examples, video encoder 20 and video decoder 30 may use two or more QTBT or MTT structures, such as one QTBT/MTT structure for the luminance component and another QTBT/MTT structure for both chrominance components (or two QTBT/MTT structures for respective chrominance components).

Video encoder 20 and video decoder 30 may be configured to use quadtree partitioning, QTBT partitioning, MTT partitioning, or other partitioning structures.

Video encoder 20 may use intra prediction or inter prediction to generate the predictive blocks for a subblock. If the video encoder 20 uses intra prediction to generate the predictive blocks of a subblock, the video encoder 20 may generate the predictive blocks of the subblock based on decoded samples of the picture associated with the subblock. If the video encoder 20 uses inter prediction to generate the predictive blocks of a subblock, the video encoder 20 may generate the predictive blocks of the subblock based on decoded samples of one or more pictures other than the picture associated with the subblock.

Some examples of JEM and VVC also provide an affine motion compensation mode, which may be considered an inter-prediction mode. In affine motion compensation mode, video encoder 20 may determine two or more motion vectors that represent non-translational motion, such as zoom in or out, rotation, perspective motion, or other irregular motion types.

To perform intra-prediction, video encoder 20 may select an intra-prediction mode to generate the prediction block. Some examples of JEM and VVC provide sixty-seven intra-prediction modes, including various directional modes, as well as planar mode and DC mode. In general, video encoder 20 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 20 codes CTUs and CUs in raster scan order (left to right, top to bottom).

After video encoder 20 generates predictive luma, Cb, and Cr blocks for one or more subblocks of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

In some examples, video encoder 20 may use quad-tree partitioning to decompose the luma, Cb, and Cr residual blocks of a CU into one or more luma, Cb, and Cr transform blocks. In other examples, the transform block is the same size as the prediction block. A transform block is a rectangular (e.g., square, or non-square) block of samples on which the same transform is applied. A transform unit (TU) or subblock of a CU may include a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

Other Video coding standards may use different block structures. As one example, although HEVC allows PUs and TUs to have different sizes or shapes, other video coding standards may require predictive blocks and transform blocks to have a same size. The techniques of this disclosure are not limited to the block structure of HEVC or VVC and may be compatible with other block structures.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may include a sequence of Network Abstraction Layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a video parameter set (VPS), a second type of NAL unit may encapsulate an RBSP for a sequence parameter set (SPS), a third type of NAL unit may encapsulate an RBSP for a picture parameter set (PPS), a fourth type of NAL unit may encapsulate an RBSP for an adaptive parameter set (APS), a fifth type of NAL unit may encapsulate an RBSP for a coded slice, a sixth type of NAL unit may encapsulate an RBSP for supplemental enhancement information (SEI) messages, and so on. NAL units that encapsulate RBSPs for video coding data (as opposed to RBSPs for parameter sets and SEI messages) may be referred to as video coding layer (VCL) NAL units.

A VPS may include data that is valid across multiple video sequences. An SPS may include data that is valid for an entire video sequence. A PPS may include data that is valid on a picture-by-picture basis. An APS may include picture-adaptive data that is also valid on a picture-by-picture basis but can change more frequently than the data in the PPS.

The video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for subblocks of the current CU to corresponding samples of the transform blocks of the TUs of the current CU. By reconstructing the coding blocks for each CU of a picture, video decoder 30 may reconstruct the picture.

Figure 2:
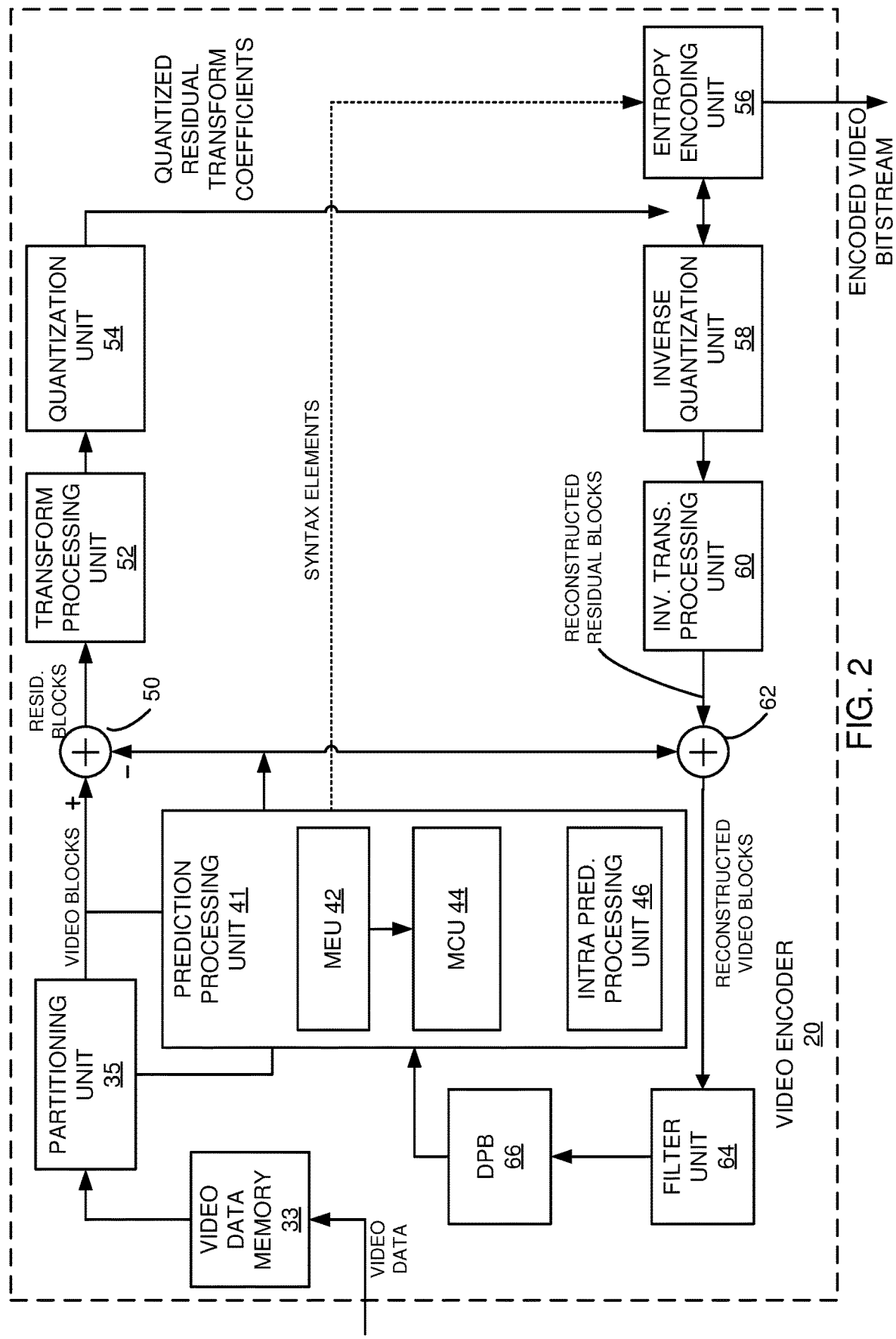
FIG. 2 is a block diagram illustrating an example video encoder that may implement the techniques described in this disclosure.

FIG. 2 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial-based compression modes. Inter-modes, such as uni-directional prediction (P mode) or bi-prediction (B mode), may refer to any of several temporal-based compression modes.

In the example of FIG. 2, the video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 2, the video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

The partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. The video encoder 20 generally illustrates the components that encode video blocks within a video slice to be encoded. The slice may be divided into multiple video blocks (and possibly into sets of video blocks referred to as tiles). The prediction processing unit 41 may select one of a plurality of possible coding modes, such as one of a plurality of intra coding modes or one of a plurality of inter coding modes, for the current video block based on error results (e.g., coding rate and the level of distortion). The prediction processing unit 41 may provide the resulting intra- or inter-coded block to summer 50 to generate residual block data and to summer 62 to reconstruct the encoded block for use as a reference picture.

The intra prediction unit 46 within prediction processing unit 41 may perform intra-predictive coding of the current video block relative to one or more neighboring blocks in the same frame or slice as the current block to be coded to provide spatial compression. The motion estimation unit 42 and motion compensation unit 44 within prediction processing unit 41 perform inter-predictive coding of the current video block relative to one or more predictive blocks in one or more reference pictures to provide temporal compression.

The motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated but are illustrated separately for conceptual purposes. The motion estimation, performed by motion estimation unit 42, is the process of generating motion vectors, which estimate motion for video blocks. A motion vector, for example, may indicate the displacement of a subblock of a video block used for prediction within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

The motion estimation unit 42 calculates a motion vector for a PU of a video block in an inter-coded slice by comparing the position of the subblock of a video block used for prediction to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

The motion compensation, performed by motion compensation unit 44, may involve fetching or generating the predictive block based on the motion vector determined by motion estimation, possibly performing interpolations to sub-pixel precision. Upon receiving the motion vector for the subblock of the current video block used for prediction, motion compensation unit 44 may locate the predictive block to which the motion vector points in one of the reference picture lists. The video encoder 20 forms a residual video block by subtracting pixel values of the predictive block from the pixel values of the current video block being coded, forming pixel difference values. The pixel difference values form residual data for the block and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After the prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

The transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, the entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30 or archived for later transmission or retrieval by video decoder 30. Entropy encoding unit 56 may also entropy encode the motion vectors and the other syntax elements for the current video slice being coded provided by prediction processing unit 41. Further, entropy encoding unit 56 may also entropy encode VPS, SPS, PPS, and/or APS information. For example, the entropy encoding unit 56 may encode APS information that indicates that a filter for a current block is to be predicted based on information in a previous APS, as described above.

The inverse quantization unit 58 and the inverse transform processing unit 60 apply inverse quantization and inverse transformation, respectively, to reconstruct the residual block in the pixel domain for later use as a reference block of a reference picture. The motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

The filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. The filter unit 64 may perform any type of filtering such as deblock filtering, SAO filtering, peak SAO filtering, ALF, and/or GALF, and/or other types of loop filters. A deblock filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

In addition, the filter unit 64 may be configured to perform any of the techniques in this disclosure related to adaptive loop filtering. For example, as described above, filter unit 64 may be configured to determine parameters for filtering a current block based on parameters for filtering a previous block that were included in the same APS as the current block, a different APS, or pre-defined filters.

Figure 3:
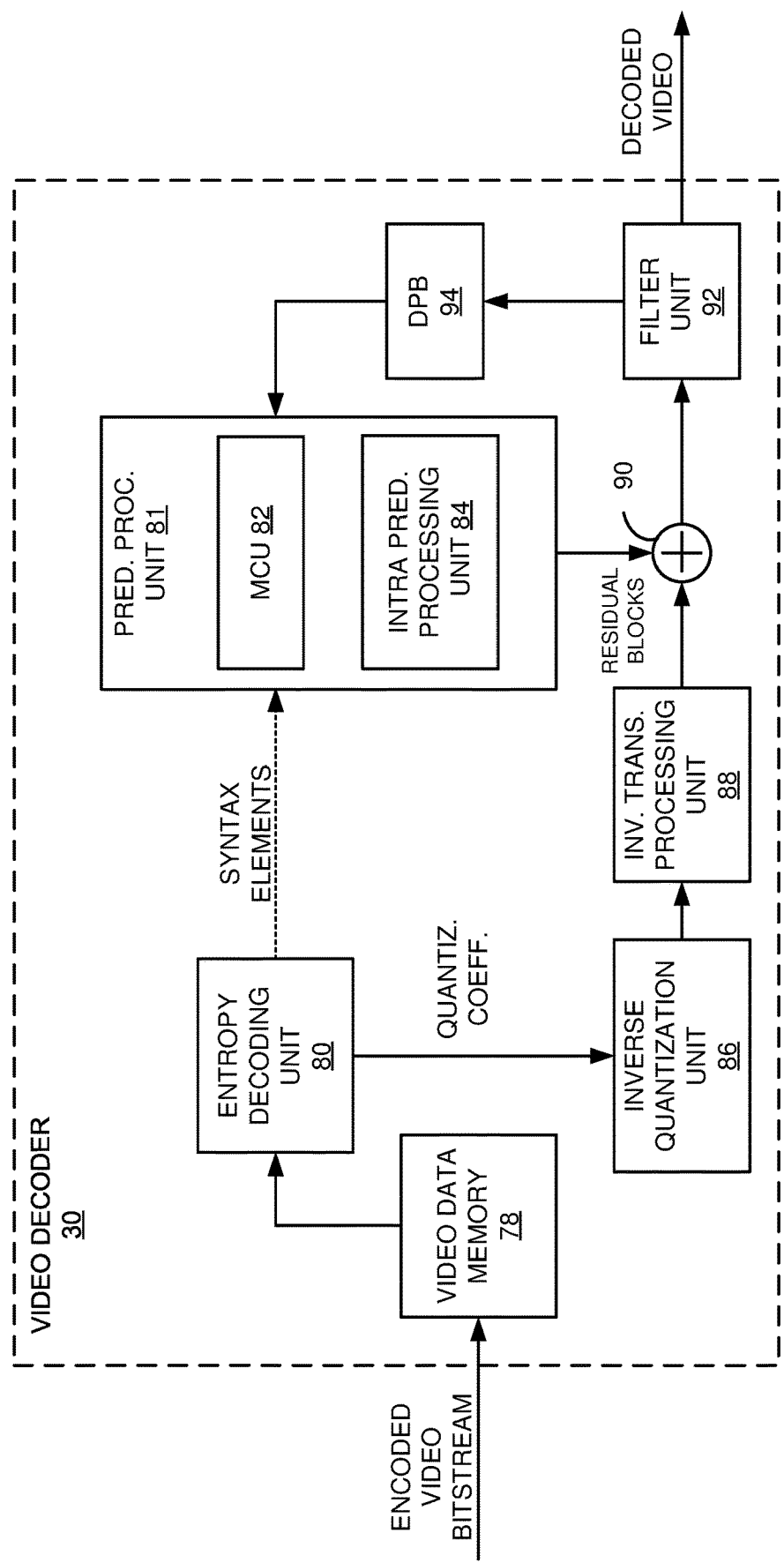
FIG. 3 is a block diagram illustrating an example video decoder that may implement the techniques described in this disclosure.

FIG. 3 is a block diagram illustrating an example video decoder 30 that may implement the techniques described in this disclosure. The video decoder 30 of FIG. 3 may, for example, be configured to receive the signaling described above with respect to video encoder 20 of FIG. 2. In the example of FIG. 3, the video decoder 30 includes video data memory 78, entropy decoding unit 80, prediction processing unit 81, inverse quantization unit 86, inverse transform processing unit 88, summer 90, DPB 94, and filter unit 92. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 2.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

The entropy decoding unit 80 of video decoder 30 entropy decodes the video data stored in video data memory 78 to generate quantized coefficients, motion vectors, and other syntax elements. The entropy decoding unit 80 forwards the motion vectors and other syntax elements to prediction processing unit 81. The video decoder 30 may receive the syntax elements at the video slice level and/or the video block level. The entropy decoding unit 80 may also decode VPS, SPS, PPS, and/or APS information. For example, the entropy decoding unit 80 may decode APS information that indicates that a filter for a current block is to be predicted based on information in a previous APS, as described above.

When the video slice is coded as an intra-coded (I) slice, the intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. The video decoder 30 may construct the reference frame lists, List 0 and List 1, using default construction techniques based on reference pictures stored in DPB 94.

The motion compensation unit 82 determines prediction information for a video block of the current video slice by parsing the motion vectors and other syntax elements and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

The motion compensation unit 82 may also perform interpolation based on interpolation filters. The motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

The inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After the prediction processing unit 81 generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. The summer 90 represents the component or components that perform this summation operation.

The filter unit 92 filters the reconstructed block (e.g. the output of summer 90) and stores the filtered reconstructed block in DPB 94 for uses as a reference block and/or outputs the filtered reconstructed block (decoded video). The reference block may be used by motion compensation unit 82 as a reference block to inter-predict a block in a subsequent video frame or picture. The filter unit 92 may perform any type of filtering such as deblock filtering, SAO filtering, peak SAO filtering, ALF, and/or GALF, and/or other types of loop filters. A deblock filter may, for example, apply deblocking filtering to filter block boundaries to remove blockiness artifacts from reconstructed video. A peak SAO filter may apply offsets to reconstructed pixel values in order to improve overall coding quality. Additional loop filters (in loop or post loop) may also be used.

In addition, the filter unit 92 may be configured to perform any of the techniques in this disclosure related to adaptive loop filtering. For example, as described above, filter unit 92 may be configured to determine parameters for filtering a current block based on parameters for filtering a previous block that were included in the same APS as the current block, a different APS, or pre-defined filters.

Figure 4:
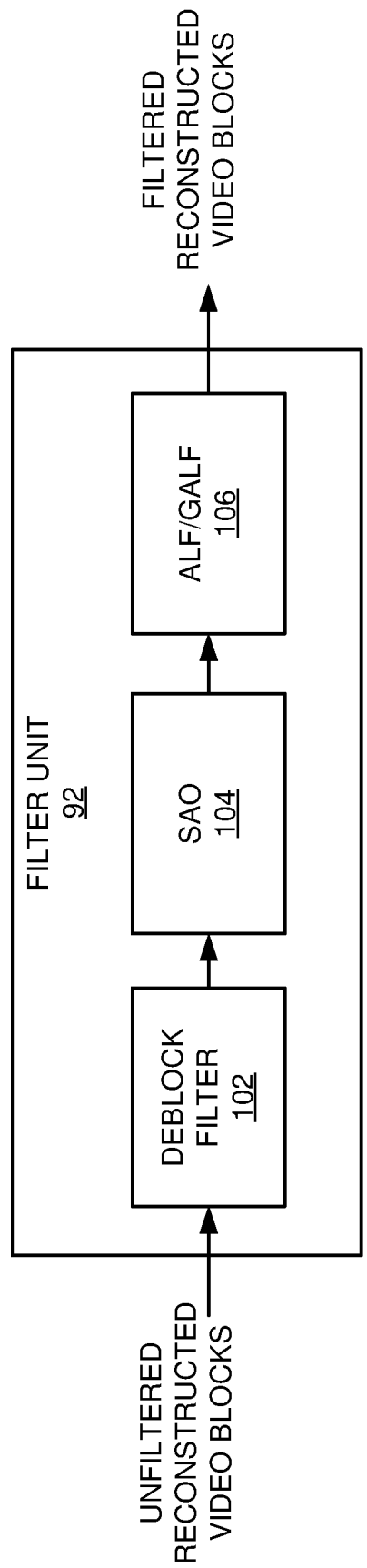
FIG. 4 shows an example implementation of a filter unit for performing the techniques of this disclosure.

FIG. 4 shows an example implementation of filter unit 92. The filter unit 64 may be implemented in the same manner. The filter units 64 and 92 may perform the techniques of this disclosure, possibly in conjunction with other components of video encoder 20 or video decoder 30. In other embodiments, the filter unit 64 can be a post-processing unit that can perform the techniques of this disclosure outside of, for example, the video decoder 30 (e.g., after the decoded video is output from the video decoder 30). In the example of FIG.

4, filter unit 92 includes deblock filter 102, SAO filter 104, and ALF/GALF filter 106. SAO filter 104 may, for example, be configured to determine offset values for samples of a block in the manner described in this disclosure. ALF/GALF filter 106 may be configured to, for example, determine parameters for filtering a current block based on parameters for filtering a previous block that were included in the same APS as the current block, a different APS, or pre-defined filters.

The filter unit 92 may include fewer filters and/or may include additional filters. Additionally, the particular filters shown in FIG. 4 may be implemented in a different order. Other loop filters (either in the coding loop or after the coding loop) may also be used to smooth pixel transitions or otherwise improve the video quality. When in the coding loop, the decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1.

The video encoder 20 and video decoder 30 described above may be configured to implement various adaptive loop filtering techniques set forth in JEM and/or working drafts of VVC. Aspects of some example JEM filtering techniques (e.g., ALF) will now be described. In addition to the modified de-blocking (DB) and HEVC SAO methods, JEM includes another filtering method called Geometry transformation-based Adaptive Loop Filtering (GALF). The input to an ALF/GALF may be the reconstructed image after the application of SAO. Aspects of GALF are described in Tsai, C. Y., Chen, C. Y., Yamakage, T., Chong, I. S., Huang, Y. W., Fu, C. M., Itoh, T., Watanabe, T., Chujoh, T., Karczewicz, M. and Lei, S. M., "Adaptive loop filtering for video coding", IEEE Journal of Selected Topics in Signal Processing, 7(6), pp. 934-945, 2013 and in M. Karczewicz, L. Zhang, W.-J. Chien, and X. Li, "Geometry transformation-based adaptive in-loop filter", Picture Coding Symposium (PCS), 2016.

The ALF techniques attempt to minimize the mean square error between the original samples and decoded/reconstructed samples by using an adaptive Wiener filter. In some embodiments, ALF can be implemented as described below.

An input image can be denoted as p, a source image as S, and a finite impulse response (FIR) filter as h. The following expression of the sum of squared errors (SSE) should be minimized, where (x, y) denotes any pixel position in p or S.

$$SSE = \Sigma_{x,y}(\Sigma_{i,j} h(i,j) p(x-i, y-j) - S(x,y))^2$$

The optimal h, denoted as $h_{opt}$, can be obtained by setting the partial derivative of SSE with respect to h(i, j) equal to 0 as follows:

$$\partial SSE / \partial h(i,j) = 0$$

This leads to the Wiener-Hopf equation shown below, which gives the optimal filter $h_{opt}$:

$$\Sigma_{i,j} h_{opt}(i,j) (\Sigma_{x,y} p(x-i, y-j) p(x-m, y-n)) = \Sigma_{x,y} S(x,y) p(x-m, y-n)$$

In some examples, instead of using one filter for the whole picture, video encoder 20 and/or video decoder 30 may be configured to classify samples in a picture into twenty-five (25) classes based on the local gradients. Video encoder 20 and/or video decoder 30 may derive separate optimal Wiener filters for the pixels in each class. Several techniques may be used to increase the effectiveness of ALF by reducing signaling overhead and computational complexity. Some of the techniques that can be used to increase ALF effectiveness by reducing signaling overhead and/or computational complexity are listed below:

1. Prediction from fixed filters: Optimal filter coefficients for each class are predicted using a prediction pool of fixed filters which include 16 candidate filters for each class. The best prediction candidate is selected for each class and only the prediction errors are transmitted.
2. Class merging: Instead of using twenty-five (25) different filters (one for each class), pixels in multiple classes can share one filter in order to reduce the number of filter parameters to be coded. Merging two classes can lead to higher cumulative SSE but a lower Rate-Distortion (RD) cost.
3. Variable number of taps: The number of filter taps is adaptive at the frame level. Filters with more taps may achieve lower SSE but may not be a good choice in terms of RD cost because of the bit overhead associated with more filter coefficients.
4. Block level on/off control: ALF can be turned on and off (enabled or disabled) on a block basis. The block size at which the on/off control flag is signaled is adaptively selected at the frame level. Filter coefficients may be recomputed using pixels from only those blocks for which an ALF is enabled (i.e., an ALF is used).
5. Temporal prediction: Filters derived for previously coded frames are stored in a buffer. If the current frame is a P or B frame, then one of the stored set of filters may be used to filter the current frame if it leads to better RD cost. A flag is signaled to indicate usage of temporal prediction. If temporal prediction is used, then an index indicating which set of stored filters is used is signaled. No additional signaling of ALF coefficients may be needed. Block level ALF on/off control flags may be also signaled for a frame using temporal prediction.

Details of some aspects of ALF are summarized in this and the following paragraphs. Some aspects of ALF are related to pixel classification and geometry transformation. In one example, the video encoder 20 and video decoder 30 discussed previously may be configured to compute sums of absolute values of vertical, horizontal, and diagonal Laplacians at all pixels within a 6×6 window that covers each pixel in a reconstructed frame (before ALF). Video encoder 20 and video decoder 30 divide the reconstructed frame into non-overlapped 2×2 blocks. The video encoder 20 and video decoder 30 classify the four pixels in these blocks into one of twenty five (25) categories, denoted as $C_k$ (k=0, 1, . . . , 24), based on the total Laplacian activity and directionality of that block. Additionally, video encoder 20 and video decoder 30 apply one of four geometry transformations (no transformation, diagonal flip, vertical flip, or rotation) to the filters based on the gradient directionality of that block.

Some aspects of adaptive loop filtering are related to filter derivation and prediction from fixed filters. For each class $C_k$, video encoder 20 and video decoder 30 first determine a best prediction filter from the pool for $C_k$, denoted as $h_{pred,k}$, based on the SSE given by the filters. The SSE of $C_k$, which is to be minimized, can be written as below, $$SSE_k = \Sigma_{x,y}(\Sigma_{i,j}(h_{pred,k}(i,j) + h_{\Delta,k}(i,j)) p(x-i, y-j) - S(x,y))^2, \quad k=0, \ldots, 24, (x,y) \in C_k$$

where $h_{\Delta,k}$ is the difference between the optimal filter for $C_k$ and $h_{pred,k}$. $p'(x, y) = \Sigma_{i,j} h_{pred,k}(i,j) p(x-i, y-j)$ is the result of filtering pixel p(x, y) by $h_{pred,k}$. Then the expression for $SSE_k$ can be re-expressed as $$SSE_k = \sum_{x,y} \left( \sum_{i,j} h_{\Delta,k}(i,j) p(x-i, y-j) - (S(x,y) - p'(x,y)) \right)^2$$

$$k = 0, \ldots, 24, (x, y) \in C_k$$

By making the partial derivative of $SSE_k$ with respect to $h_{\Delta,k}(i,j)$ equal to 0, the modified Wiener-Hopf equation can be obtained as follows:

$$\sum_{i,j} h_{\Delta,k}(i,j) \left( \sum_{x,y} p(x-i, y-j) p(x-m, y-n) \right) =$$

$$\sum_{x,y} (S(x,y) - p'(x,y)) p(x-m, y-n)$$

$$k = 0, \ldots, 24, (x, y) \in C_k$$

For the simplicity of expression, $\Sigma_{x,y} p(x-i, y-j) p(x-m, y-n)$ and $\Sigma_{x,y}(S(x,y)-p'(x,y))p(x-m, y-n)$ can be denoted with $(x,y) \in C_k$ by $R_{pp,k}(i-m, j-n)$ and $R'_{ps,k}(m,n)$, respectively. Then, the above equation can be expressed as:

$$\Sigma_{i,j} h_{\Delta,k}(i,j) R_{pp,k}(i-m, j-n) = R'_{ps,k}(m,n) \quad k = 0, \ldots, 24 \quad (1)$$

For every $C_k$, the auto-correlation matrix $R_{pp,k}(i-m, j-n)$ and cross-correlation vector $R'_{ps,k}(m, n)$ are computed over all $(x, y) \in C_k$.

In one example of adaptive loop filtering, video encoder 20 calculates and transmits only the difference between the optimal filter and the fixed prediction filter. If none of the candidate filters available in the pool is a good predictor, then video encoder 20 and video decoder 30 uses the identity filter (i.e., the filter with only one non-zero coefficient equal to 1 at the center that makes the input and output identical) as the predictor.

Some aspects of adaptive loop filtering relate to the merging of pixel classes. Classes are merged to reduce the overhead of signaling filter coefficients. The cost of merging two classes is increased with respect to SSE. Two classes $C_m$ and $C_n$ with SSEs given by $SSE_m$ and $SSE_n$, respectively can be determined. $C_{m+n}$ can denote the class obtained by merging $C_m$ and $C_n$ with SSE, $SSE_{m+n}$. $SSE_{m+n}$ can always be greater than or equal to $SSE_m + SSE_n$. $\Delta SSE_{m+n}$ can denote the increase in SSE caused by merging $C_m$ and $C_n$, which is equal to $SSE_{m+n} - (SSE_m + SSE_n)$. To calculate $SSE_{m+n}$, video encoder 20 may derive $h_{\Delta,m+n}$, the filter prediction error for $C_{m+n}$, using the following expression similar to (1):

$$\Sigma_{i,j} h_{\Delta,m+n}(i,j)(R_{pp,m}(i-u,j-v) + R_{pp,n}(i-u,j-v)) = R'_{ps,m}(u,v) + R'_{ps,n}(u,v) \quad (2)$$

Video encoder 20 may calculate the SSE for the merged category $C_{m+n}$ as:

$$SSE_{m+n} = -\Sigma_{u,v} h_{\Delta,m+n}(u,v)(R'_{ps,m}(u,v) + R'_{ps,n}(u,v)) + (R_{ss,m} + R_{ss,n})$$

To reduce the number of classes from N to N−1, two classes, $C_m$ and $C_n$, may need to be found, such that merging them leads to the smallest $\Delta SSE_{m+n}$ compared to any other combinations. In some ALF designs, video encoder 20 is configured to check every pair of available classes for merging to find the pair with the smallest merge cost.

If $C_m$ and $C_n$ (with m<n) are merged, then video encoder 20 and video decoder 30 may mark $C_n$ as unavailable for further merging and the auto- and cross-correlations for $C_m$ are changed to the combined auto- and cross-correlations as follows:

$$R_{pp,m} = R_{pp,m} R_{pp,n}$$

$$R'_{ps,m} = R'_{ps,m} + R'_{ps,n}$$

$$R_{ss,m} = R_{ss,m} + R_{ss,n}.$$

The video encoder 20 may determine an optimal number of ALF classes after merging for each frame based on the RD cost. In one example, this is done by starting with twenty-five (25) classes and merging a pair of classes (from the set of available classes) successively until there is only one class left. For each possible number of classes (1, 2, . . . , 25) left after merging, video encoder 20 may store a map indicating which classes are merged together. Video encoder 20 can then select the optimal number of classes such that the RD cost is minimized as follows:

$$N_{opt} = \underset{N}{\operatorname{argmin}}(J|_N = D|_N + \lambda R|_N),$$

where $D|_N$ is the total SSE of using N classes ($D|_N = \Sigma_{k=0}^{N-1} SSE_k$), $R|_N$ is the total number of bits used to code the N filters, and $\lambda$ is the weighting factor determined by the quantization parameter (QP). Video encoder 20 may transmit the merge map for $N_{opt}$ number of classes, indicating which classes are merged together, to video decoder 30.

Aspects of signaling ALF parameters are described below. A brief step-by-step description of an example ALF parameter encoding process performed by video encoder 20 is given below. The video decoder 30 may be configured to perform a reciprocal process (e.g., signal from the perspective of video decoder 30 is the reception of syntax elements).

Figure 7A:
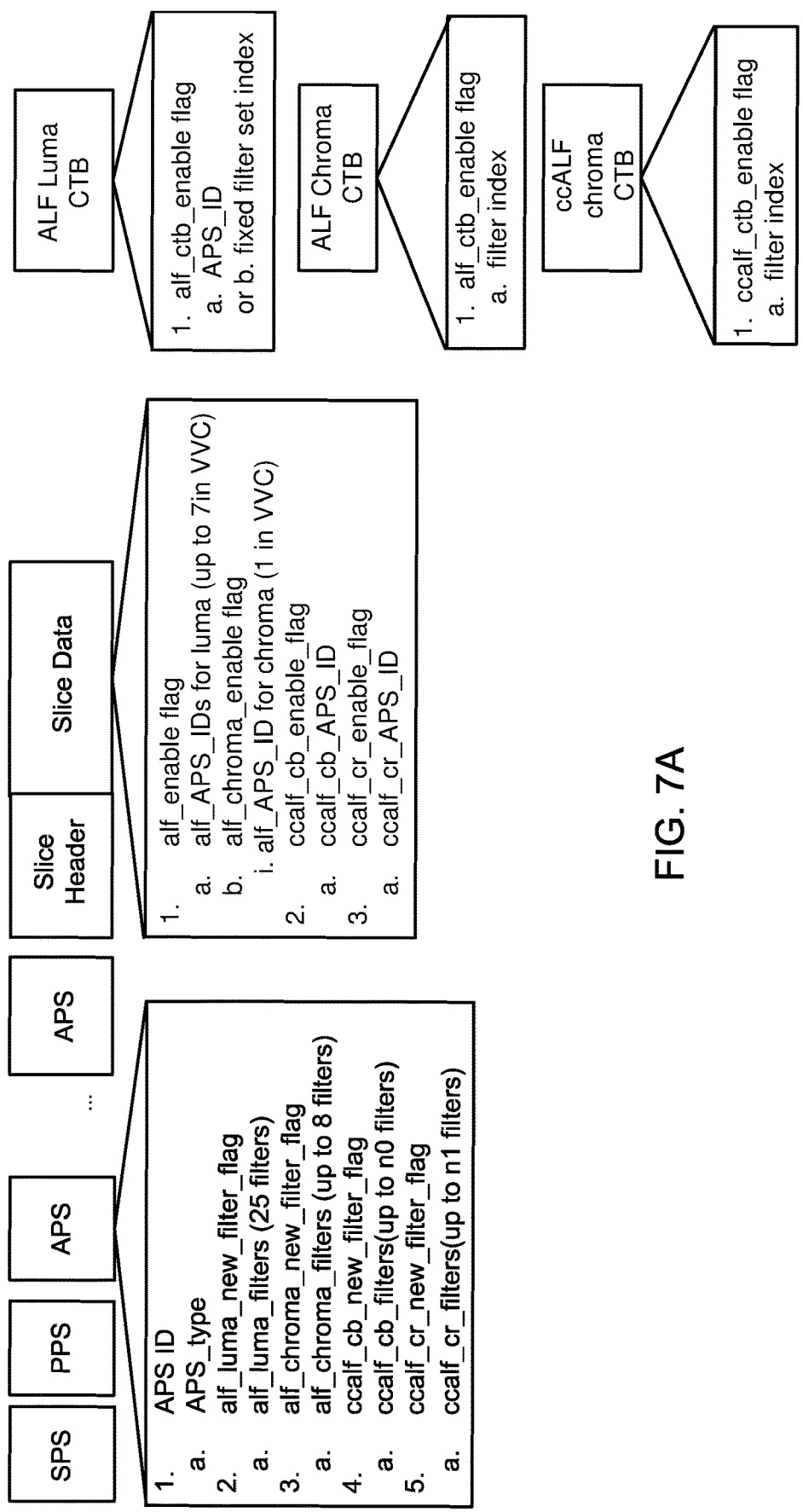
FIG. 7A shows different examples of what parameters may be transmitted in the bitstream by a video encoder and received by a video decoder according to the techniques described in this disclosure.
Figure 7B:
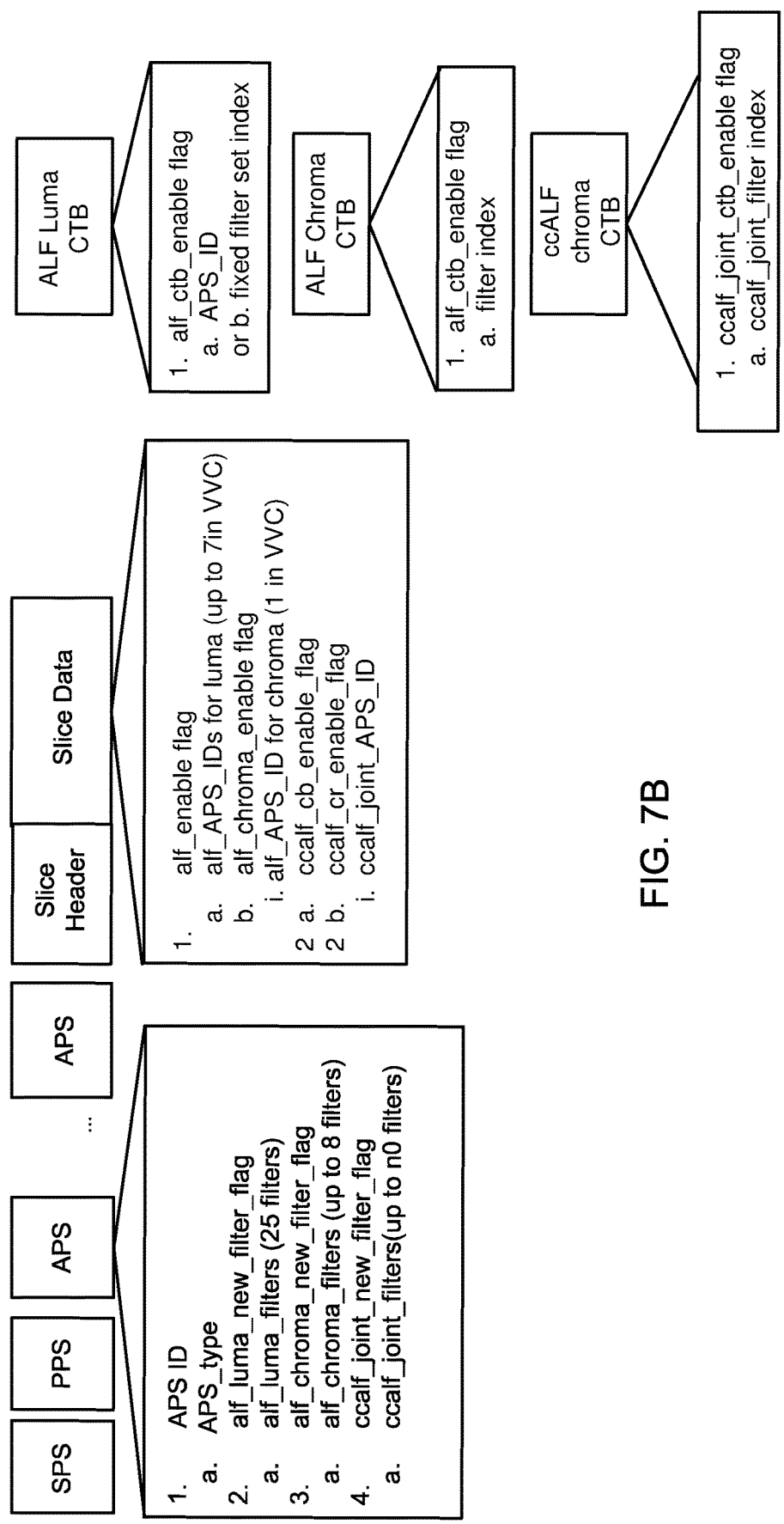
FIG. 7B shows different examples of what parameters may be transmitted in the bitstream by a video encoder and received by a video decoder according to the techniques described in this disclosure including relating to joint chroma filters.

1. Signal the frame level ALF on/off flag, which may be referred to as ALF_enable (as shown in FIG. 7A).
2. If ALF is on, then signal the temporal prediction flag indicating the usage of the filters from the previous pictures.
3. If temporal prediction is used, then signal the index of the frame from which the corresponding ALF parameters are used for filtering the current frame.
4. If temporal prediction is not used, then signal the auxiliary ALF information and filter coefficients as follows:
    a. The following auxiliary ALF information may be signaled before signaling the filter coefficients. The auxiliary ALF information may include:
        i. The number of unique filters used after class merging.
        ii. Number of filter taps.
        iii. Class merge information indicating which classes share the filter prediction errors.
        iv. Index of the fixed filter predictor for each class.
    b. After signaling the auxiliary ALF information, filter coefficient prediction errors may be signaled as follows:
        i. A flag is signaled to indicate if the filter prediction errors are forced to zero (0) for some of the remaining classes after merging.
        ii. A flag is signaled to indicate if differential coding is used for signaling filter prediction errors (if the number of classes left after merging is larger than one (1)).
        iii. Filter coefficient prediction errors are then signaled using k-th order Exp-Golomb code, where the k-value for different coefficient positions is selected empirically.

c. Filter coefficients for chroma components, if available, are directly coded without any prediction methods.
5. Finally, the block-level ALF on/off control flags are signaled.
6. In this disclosure, new block-level ALF flags are added. For example, as shown in FIG. 7A, alf_luma_new_filter_flag, alf_chroma_new_filter_flag, calf_cb_new_filter_flag, and ccalf_cr_new_filter_flag are new ALF flags. Also, as shown in FIG. 7B alf_luma_new_filter_flag, alf_chroma_new_filter_flag, and ccalf_joint_new_filter_flag are new ALF flags.

In some embodiments, there may be challenges with the current step by step approach which are highlighted in the section below Signaling challenges in ALF[0001].

ALF with Clipping

Described below are examples ALF techniques with clipping that can be performed, for example, by video encoder 20 and/or video decoder 30.

In some embodiments, decoded filter coefficients f(k,l) and clipping values c(k,l) are applied to a reconstructed image R(i,j) as follows:

$$\tilde{R}(i, j) = R(i, j) + \sum_{k,l=(-K,-K),k,l\neq(0,0)}^{K,K} f(k, l) * clip3(-c(k, l), c(k, l), R(i+k, j+l))$$

FIG. 2 shows an example of ALF filter supports that can be used with techniques described in this disclosure. In particular, FIG. 2 shows a 5×5 diamond filter support 200, a 7×7 diamond filter support 210, and a 9×9 diamond filter support 220 that can be used with ALF techniques.

A 7×7 filter (e.g., filter 210) can applied to the luma component and a 5×5 filter (e.g., filter 200) can be applied to chroma components.

Clipping value c(k,l) is calculated as follows. For the luma component:

$$c(k,l) = Round(2^{(BitDepthY*(4-clipIdx(k,l))/4)})$$

Where BitDepthY is the bit depth for the luma component and clipIdx(k,l) is the clipping values at position (k,l). clipIdx(k,l), which can be 0, 1, 2 or 3.

For the chroma components:

$$c(k,l) = Round(2^{(BitDepthC-8)} * 2^{(8*(3-clipIdx[k,l])/3)})$$

Where BitDepthC is the bit depth for the chroma component and clipIdx(k,l) is the clipping values at position (k,l). clipIdx(k,l), which can be 0, 1, 2 or 3.

Pixel Classification

For the luma component, 4×4 blocks in the whole picture can be classified based on a 1D Laplacian direction (up to 5 directions) and a 2D Laplacian activity (up to 5 activity values). The direction $Dir_b$ and unquanitzed activity $Act_b$ can be calculated. $Act_b$ can be further quantized to the range of 0 to 4 inclusively.

Values of two diagonal gradients, in addition to the horizontal and vertical gradients used in the existing ALF, are calculated using the 1-D Laplacian direction. As shown in (3) to (6) below, the sum of gradients of all pixels within an 8×8 window that covers a target pixel is employed as the represented gradient of the target pixel, where R(k, l) is the reconstructed pixels at location (k, l) and indices i and j refer to the coordinates of the upper left pixel in the 4×4 block. Each pixel is associated with four gradient values, with the vertical gradient denoted by $g_v$, the horizontal gradient denoted by $g_h$, the 135 degree diagonal gradient denoted by $g_{d1}$, and the 45 degree diagonal gradient denoted by $g_{d2}$.

$$g_v = \sum_{k=i-2}^{i+5} \sum_{l=j-2}^{j+5} V_{k,l}, \quad (3)$$

$$V_{k,l} = |2R(k, l) - R(k, l-1) - R(k, l+1)|$$

$$g_h = \sum_{k=i-2}^{i+5} \sum_{l=j-2}^{j+5} H_{k,l}, \quad (4)$$

$$H_{k,l} = |2R(k, l) - R(k-1, l) - R(k+1, l)|$$

$$g_{d1} = \sum_{k=i-2}^{i+5} \sum_{l=j-3}^{j+5} D1_{k,l}, \quad (5)$$

$$D1_{k,l} = |2R(k, l) - R(k-1, l-1) - R(k+1, l+1)|$$

$$g_{d2} = \sum_{k=i-2}^{i+5} \sum_{j=j-2}^{j+5} D2_{k,l}, \quad (6)$$

$$D2_{k,l} = |2R(k, l) - R(k-1, l+1) - R(k+1, l-1)|$$

To assign the directionality $Dir_b$, the ratio of the maximum and the minimum of the horizontal and vertical gradients, denoted by $R_{h,v}$ in (7) and the ratio of the maximum and the minimum of two diagonal gradients, denoted by $R_{d1,d2}$ in (8) are compared against each other with two thresholds $t_1$ and $t_2$.

$$R_{h,v} = g_{h,v}^{max}/g_{h,v}^{min} \quad (7)$$

wherein $g_{h,v}^{max} = \max(g_h, g_v)$, $g_{h,v}^{min} = \min(g_h, g_v)$, $$R_{d0,d1} = g_{d0,d1}^{max}/g_{d0,d1}^{min} \quad (8)$$

wherein $g_{d0,d1}^{max} = \max(g_{d0}, g_{d1})$, $g_{d0,d1}^{min} = \min(g_{d0}, g_{d1})$ By comparing the detected ratios of the horizontal/vertical and diagonal gradients, five direction modes, i.e., $Dir_b$ within the range of [0, 4] inclusive, are defined in (9). The values and physical meaning of $Dir_b$ are described in Table 1.

$$D = \begin{cases} 0 & R_{h,v} \leq t_1 \;\&\&\; R_{d0,d1} \leq t_1 \\ 1 & R_{h,v} > t_1 \;\&\&\; R_{h,v} > R_{d0,d1} \;\&\&\; R_{h,v} > t_2 \\ 2 & R_{h,v} > t_1 \;\&\&\; R_{h,v} > R_{d0,d1} \;\&\&\; R_{h,v} \leq t_2 \\ 3 & R_{d0,d1} > t_1 \;\&\&\; R_{h,v} \leq R_{d0,d1} \;\&\&\; R_{d0,d1} > t_2 \\ 4 & R_{d0,d1} > t_1 \;\&\&\; R_{h,v} \leq R_{d0,d1} \;\&\&\; R_{d0,d1} \leq t_2 \end{cases} \quad (9)$$

TABLE 1

Values of Direction and Its Physical Meaning

| Direction values | physical meaning |
|---|---|
| 0 | Texture |
| 1 | Strong horizontal/vertical |
| 2 | horizontal/vertical |
| 3 | strong diagonal |
| 4 | diagonal |

The activity value Act can be calculated as:

$$\text{Act} = \sum_{k=i-2}^{i+5} \sum_{l=j-2}^{j+5} (V_{k,l} + H_{k,l}). \quad (10)$$

Act is further quantized to the range of 0 to 4 inclusive, and the quantized value is denoted as Â.
Quantization Process from Activity Value Act to Activity Index Â

The quantization process can be defined as follows:

avg_var=Clip_post(NUM_ENTRY−1,
  (Act*ScaleFactor)>>shift).

Â=ActivityToIndex[avg_var]

wherein NUM_ENTRY is set to 16, ScaleFactor is set to 64, shift is (4+internal coded-bitdepth), ActivityToIndex[NUM_ENTRY]={0, 1, 2, 2, 2, 2, 2, 3, 3, 3, 3, 3, 3, 3, 3, 4}, and function Clip_post(a, b) returns the smaller value between a and b.

In total, each 4×4 luma block can be categorized into one out of 25 (5×5) classes and an index is assigned to each 4×4 block according the value of $Dir_b$ and $Act_b$ of the block. The group index can be denoted by C and is set equal to $5Dir_b+\hat{A}$ wherein Â is the quantized value of $Act_b$.
Geometry Transformations For each category, one set of filter coefficients and clipping values may be signaled. To better distinguish different directions of blocks marked with the same category index, four geometry transformations, including no transformation, diagonal, vertical flip, and rotation, are introduced.

Figure 5:
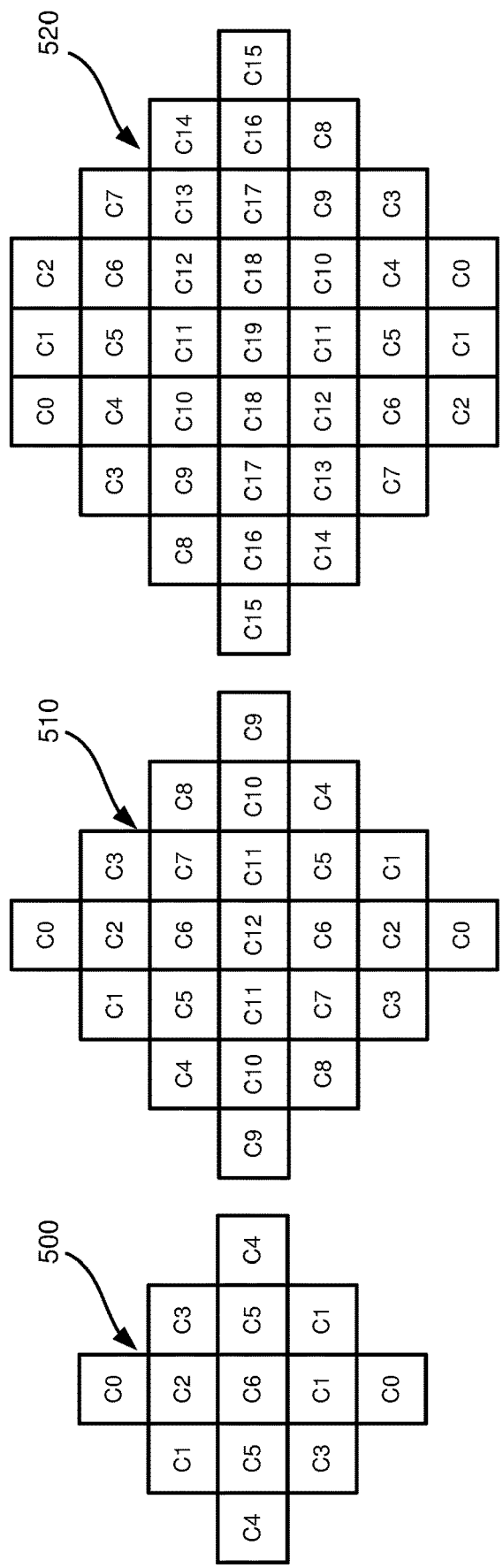
FIG. 5 shows an examples of ALF filter supports that can be used with techniques described in this disclosure.
Figure 6:
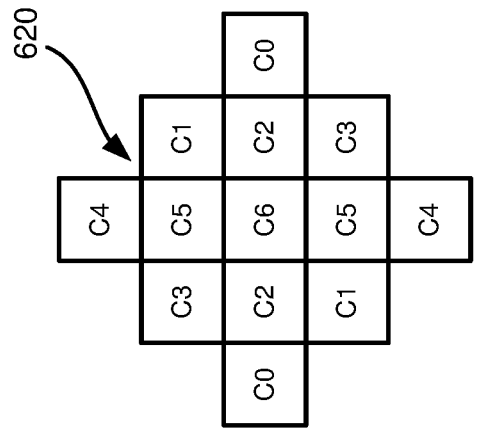
FIG. 6 shows examples of geometry transformations that can be used with techniques described in this disclosure.
Figure 6:
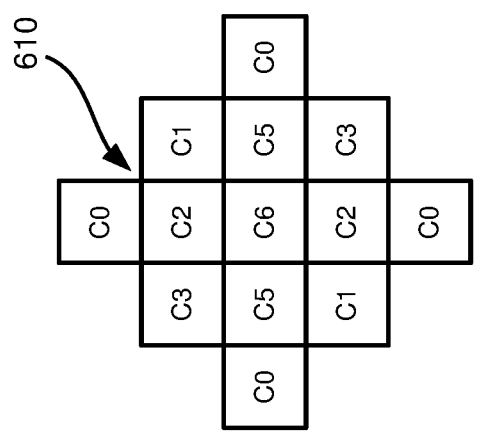
Figure 6:
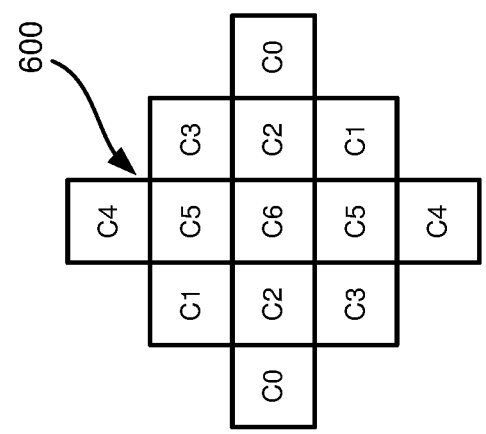

FIG. 5 shows examples of geometry transformations that can be used with techniques described in this disclosure. In particular, FIG. 5 can show geometry transformations of different filter supports 500, 510, and 520. In some embodiments, the geometry transformations can be geometry transformations of the filter support 500 shown in FIG. 5. In further embodiments, the geometry transformation can be diagonal geometry transformations of the filter support 500 e.g., as shown in FIG. 6 the filter support 600. Or in other embodiments, the geometry transformation 610 can be a vertical flip transform of the filter support 500, and the geometry transformation of the filter support 620 can be a rotation transform of the filter support 500.

The geometric transformations shown between FIG. 5 filter support 500 and FIG. 6 can be represented in formula forms as follows:

Diagonal: $f_D(k,l)=f(l,k), c_D(k,l)=c(l,k)$,

Vertical flip: $f_V(k,l)=f(k,K-l-1), c_V(k,l)=c(k,K-l-1)$

Rotation: $f_R(k,l)=f(K-l-1,k), c_R(k,l)=c(K-l-1,k)$. (11)

where K is the size of the filter and 0≤k,l≤K−1 are coefficients coordinates, such that location (0,0) is at the upper left corner and location (K−1, K−1) is at the lower right corner.

In embodiments when the diamond filter support is used, the coefficients with coordinates out of the filter support may be set to 0. In some embodiments, the geometry transformation index can be indicated by deriving it implicitly to avoid additional overhead. In GALF, the transformations are applied to the filter coefficients f(k, l) depending on gradient values calculated for that block. The relationship between the transformation and the four gradients calculated using (3)-(6) is described in Table 2. To summarize, the transformations are based on which one of two gradients (horizontal and vertical, or 45 degree and 135 degree gradients) is larger. Based on the comparison, more accurate direction information can be extracted. Therefore, different filtering results could be obtained due to the transformation while the overhead of filter coefficients is not increased.

TABLE 2

Mapping of Gradient and Transformations.

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

Filter Information Signaling

In some embodiments, one luma filter parameter set can contain filter information (including filter coefficients and clipping values) for all 25 classes.

Fixed filters can be used to predict the filters for each class. A flag can be signaled for each class to indicate whether this class uses a fixed filter as its filter predictor. If yes, the fixed filter information is signaled.

To reduce the number of bits required to represent the filter coefficients, different classes can be merged. The information indicating which classes are merged is provided by sending an index $i_C$ for each of the 25 classes. Classes having the same index $i_C$ share the same filter coefficients that are coded. The mapping between classes and filters is signaled for each luma filter set. The index $i_C$ is coded with a truncated binary binarization method.

A signaled filter can be predicted from a previously signaled filter.
Adaptive Parameter Set Adaptive parameter sets (APSs) can be used to carry ALF filter coefficients in the bitstream. An APS can contain a set of luma filter parameters or a set(s) of chroma filter parameters, or a combination thereof. A tile group (i.e., a group of one or more tiles) may only signal indices of APSs that are used for the current tile group in its tile group header. APSs can be used in various video coding standards, such as VVC. Currently there are up to eight APSs used in VVC, however, more, or less may be used in the future in VVC or other video coding standards.
CTU/CTB-Based Filter Set Switch Filters generated from previously coded tile groups can be used for the current tile group to save the overhead for filter signaling. A luma CTU/CTB can use a filter set among fixed filter sets and non-fixed filter sets from an APS s. The filter set index can be signaled. All chroma CTBs may use a filter from the same APS. In the tile group header, the APSs used for luma and chroma CTBs of the current tile group can be signaled.

In some cases, luma coefficients, chroma coefficients, cross-component Cb coefficients, or cross component Cr coefficients are signaled even though the coefficients are equal to a threshold, where the threshold could be zero or non-zero. This disclosure describes techniques to improve signaling redundancies when using adaptive loop filtering by applying different constraints to address these problems and other signaling information which is redundant. The video encoder 20 and/or video decoder 30 may apply any of the following itemized techniques individually. Alternatively, the video encoder 20 and/or video decoder 30 may apply any combination of the techniques described for performing ALF filter signaling redundancy removal in APS.

The APS can include information about how new filter sets are formed in picture/slice/tile group headers, such that the new filter sets can be used in that picture/slice/tile group.

Signaling Challenges in ALF[0002]

In the VVC draft 7 (JVET-P2001), adaptive loop filters (ALF) are signaled in ALF adaptation parameter sets (APS). One ALF may contain a set of luma filters and/or a set of chroma filters. Each luma filter set may have up to 25 filters. Each chroma filter set may have up to 8 filters. A luma coding tree block may be referencing to an ALF APS and use the luma filter set. A chroma coding tree block may be referencing to an ALF APS and use one chroma filter in the chroma filter set.

FIG. 7A shows different examples of what parameters may be transmitted in the bitstream by the video encoder 20 and received by the video decoder 30 including new parameters (to be discussed below) to address some of the signaling challenges in ALF.

Each Adaptation Parameter Set (APS) that's sent may include the following (as shown in FIG. 7A): (1) an APS Identification value (ID), (1a) the APS_type, (2) an alf_luma_new_filter_flag, and (2a) alf_luma_filters. The alf_luma_new_filter_flag is a luma new filter value and may designate whether or not the luma coefficients in a luma filter, or in a series of filters are equal to a threshold value (e.g., 0 or some non-zero value depending on the implementation). In one embodiment, the alf_luma_new_filter_flag may be used for all luma filters in one APS. In a different embodiment, there may be multiple alf_luma_new_ filter flags, one, for each luma filter. In yet another embodiment, the alf_luma_new_filter_flag may be a multi-bit value which is able to determine which filter up to the max number of luma filters in an APS are transmitted. In a different embodiment, the alf_luma_new_filter_flag may be a binary value, i.e., 0 or 1. In such a case, the alf_luma_new_filter_flag represents whether any of the luma filter coefficients across all luma filters (e.g., all 25 luma filters) have a non-zero value or not.

Each Adaptation Parameter Set (APS) that is sent may also include the following (as shown in FIG. 7A): (3) an alf_chroma_new_filter_flag, and (3a) alf_chroma_filters. The alf_chroma_new_filter_flag is a chroma filter new filter value and may designate whether or not the chroma coefficients have a non-zero value or not. In one embodiment, the alf_chroma_new_filter_flag may be used for all chroma filters in one APS. In a different embodiment, there may be multiple alf_chroma_new_filter flags, one for each chroma filter. In yet another embodiment, the alf_chroma_new_filter_flag may be a multi-bit value which is able to determine which filter up to the max number of chroma filters in an APS are transmitted. In a different embodiment, the alf_chroma_new_filter_flag may be a binary value, i.e., 0 or 1. In such a case, the alf_chroma_new_filter_flag represents whether any of the chroma filter coefficients across all chroma filters (e.g., all 8 chroma filters) have a non-zero value or not. An example structure of the ALF data is represented below (VVC draft 7). This may be used to implement some of the filter information signaling techniques discussed previously.

|  | Descriptor |
|---|---|
| alf_data( ) { |  |
|     alf_luma_filter_signal_flag | u(1) |
|     alf_chroma_filter_signal_flag | u(1) |
|     if( alf_luma_filter_signal_flag ) { |  |
|         alf_luma_clip_flag | u(1) |
|         alf_luma_num_filters_signaled_minus1 | ue(v) |
|         if( alf_luma_num_filters_signaled_minus1 > 0 ) { |  |
|             for( filtIdx = 0; filtIdx < NumAlfFilters; filtIdx++ ) |  |
|                 alf_luma_coeff_delta_idx[ filtIdx ] | u(v) |
|         } |  |
|         for( sfIdx = 0; sfIdx <= alf_luma_num_filters_signaled_minus1; sfIdx++ ) { |  |
|             for( j = 0; j < 12; j++ ) { |  |
|                 alf_luma_coeff_abs[ sfIdx ][ j ] | uek(v) |
|                 if( alf_luma_coeff_abs[ sfIdx ][ j ] ) |  |
|                       alf_luma_coeff_sign[ sfIdx ][ j ] | u(1) |
|             } |  |
|         } |  |
|         if( alf_luma_clip_flag ) { |  |
|             for( sfIdx = 0; sfIdx <= alf_luma_num_filters_signaled_minus1; sfIdx++ ) { |  |
|                 for( j = 0; j < 12; j++ ) |  |
|                     alf_luma_clip_idx[ sfIdx ][ j ] | u(2) |
|             } |  |
|         } |  |
|     } |  |
|     if( alf_chroma_filter_signal_flag ) { |  |
|         alf_chroma_num_alt_filters_minus1 | ue(v) |
|             for( altIdx = 0; altIdx <= alf_chroma_num_alt_filters_minus1; altIdx++ ) { |  |
|                 alf_chroma_clip_flag[ altIdx ] | u(1) |
|             for( j = 0; j < 6; j++ ) { |  |
|                 alf_chroma_coeff_abs[ altIdx ][ j ] | uek(v) |
|                 if( alf_chroma_coeff_abs[ altIdx ][ j ] > 0 ) |  |
|                     alf_chroma_coeff_sign[ altIdx ][ j ] | u(1) |
|             } |  |
|             if( alf_chroma_clip_flag[ altIdx ] ) { |  |
|                 for( j = 0; j < 6; j++ ) |  |
|                     alf_chroma_clip_idx[ altIdx ][ j ] | u(2) |
|             } |  |
|         } |  |
|     } |  |
| } |  |

To use ALF APS efficiently, several constraints are added to increase the chance that there are filters in an ALF APS. For example, one constraint that may be added when signaling (sending or receiving) an ALF APS in a bitstream, is that the values of certain flags, e.g., the alf_luma_filter_signal_flag and alf_chroma_filter_signal_flag shall not both be disabled. It should be noted that zero may indicate disabled depending on an implementation. In other implementations, a one may indicate disabled. That is to say, an ALF APS may contain at least one luma filter set of luma coefficients and/or an ALF APS may contain at least one chroma filter set of chroma coefficients when encoding or decoding video data. The alf_luma_filter_signal_filter_flag and alf_chroma_filter_signal_flag represent new flags, which may be also referred to as an alf_luma_new_filter_flag, and alf_chroma_new_filter_flag (as shown in FIG. 7A in one of the APS's). In VVC, there may be up to 8 APS's transmitted, which with an APS ID (an identification code or value that designates which APS of the 8 is being transmitted (by the encoder device 20 or received by the decoder device 30).

The alf_luma_filter_signal_flag and alf_chrama_new_fiter_flag, represented in FIG. 7A in one of the APS's, are parameters that are transmitted in the bitstream as a result of encoding video data. A current unit is accessed during encoding that is associated with more than one parameter set. The current unit may be a block, tile, tile group, sub-picture, picture, slice, sub-picture, a plurality of blocks, or an area.

The current unit accesses may be associated with more than one adaptation parameter set (APS).

In another example, another constraint that may be added when a luma CTB is referencing an ALF APS, is that the value of alf_luma_filter_signal_flag in a particular APS shall be enabled (i.e., 1 or 0 depending on the implementation). Referring back to FIG. 7A, the alf_ctb_enable_flag is an ALF on/off flag for a luma CTB. If the alf_ctb_enable_flag is enabled (i.e., on), then a filter set index associated with a luma filter may be signaled. When a filter set index is signaled it may be a fixed filter set index as in FIG. 7A or an APS ID could be signaled which means that the luma CTB is referencing the ALF APS based on an identification value.

In yet another example for adding a constraint, is that when a chroma CTB is referencing an ALF APS, the value of alf_chroma_filter_signal_flag in this APS shall be enabled. This embodiment is possible when a chroma CTB may use multiple chroma filters. As an example, if all chroma CTBs in one slice reference one APS, a chroma CTB may use one filter from the referenced APS. While the luma CTB may use all the luma filters in its referenced APS, not all chroma filters may be used. The number of chroma filters used may be configurable. There is also an alf_ctb_enable_flag that is an ALF on/off flag for a chroma CTB. If the alf_ctb_enable_flag is enabled (i.e., on), then a filter set index (associated with one of the chroma filters) may be signaled. When a filter set index associated with a chroma filter is signaled it may be a fixed filter set index as in FIG. 7A.

In JVET-P1008, a cross-component ALF (CCALF) is proposed to enhance coding efficiency. Each cross component (CC) chroma component (Cb or Cr) may have their own filter set(s). The ALF cross component flags, which are in the syntax structures below, may be used in the similar way of alf_chroma_filter_signal_flag. That is to say, the ccalf_ctb_enable_flag that is an ALF on/off flag for a CCALF chroma CTB. If the ccalf_ctb_enable_flag is enabled (i.e., on), then a filter set index (associated with one of the CC chroma filters) may be signaled. When a filter set index associated with a CC chroma filter is signaled it may be a fixed filter set index as in FIG. 7A. In addition, referring back to FIG. 7A, it can be seen that each Adaptation Parameter Set (APS) that's sent may also include the following: (4) ccalf_cb_new_filter_flag, (4a) ccalf_cb_filters), (5) ccalf_cr_new_filter_flag, and (5a) ccalf_cr_filters). The ccalf_cb_new_filter_flag is represented as alf_cross_component_cb_filter_signal_flag in the structure below. The ccalf_cr_new_filter_flag is represented as alf_cross_component_cr_filter_signal_flag.

The structures represented below indicate that the elements in bold may be signaled in a bitstream.

|  | Descriptor |
|---|---|
| alf_data( ) { |  |
|     alf_luma_filter_signal_flag | u(1) |
|     alf_chroma_filter_signal_flag | u(1) |
|     alf_cross_component_cb_filter_signal_flag | u(1) |
|     alf_cross_component_cr_filter_signal_flag | u(1) |
|     if( alf_luma_filter_signal_flag ) { |  |
|         ... |  |
|     } |  |
|     if( alf_chroma_filter_signal_flag ) { |  |
|         ... |  |
|     } |  |
|     if ( alf_cross_component_cb_filter_signal_flag ) { |  |
|         alf_cross_component_cb_filters_signaled_minus1 | ue(v) |
|         for (k = 0; k < (alf_cross_component_cb_filters_signaled_minus1+1); k++ ) { |  |
|             for ( j = 0; j < 8; j++ ) |  |
|                 alf_cross_component_cb_coeff_plus32[ k ][ j ] | u(6) |
|         } |  |
|     } |  |
|     if ( alf_cross_component_cr_ filter_signal_flag ) { |  |
|         alf_cross_component_cr_filters_signaled_minus1 | ue(v) |
|         for (k = 0; k < (alf_cross_component_cr_filters_signaled_minus1+1); k++ ) { |  |
|             for ( j = 0; j < 8; j++ ) |  |
|                 alf_cross_component_cr_coeff_plus32[ k ][ j ] | u(6) |
|         } |  |
|     } |  |

In the slice header, an APS index may be signaled for each chroma component. A chroma CTB in the slice can choose a filter from the filter set of that component in the APS.

```
if( ChromaArrayType != 0 )
    slice_cross_component_alf_cb_enabled_flag      u(1)
if( slice_cross_component_alf_cb_enabled_flag ) {
    slice_cross_component_alf_cb_aps_id            u(3)
}
if( ChromaArrayType != 0 )
    slice_cross_component_alf_cr_enabled_flag      u(1)
if( slice_cross_component_alf_cr_enabled_flag ) {
    slice_cross_component_alf_cr_aps_id            u(3)
}
```

In a different embodiment, two chroma components may share the same joint filter set. In an ALF APS, the flag alf_cross_component_joint_filter_signal_flag may be used similarly as the separate alf_cross_component_cb_filter_signal_flag and the alf_cross_component_cr_filter_signal_flag.

| | Descriptor |
|---|---|
| alf_data( ) { | |
|     alf_luma_filter_signal_flag | u(1) |
|     alf_chroma_filter_signal_flag | u(1) |
|     alf_cross_component_joint_filter_signal_flag | u(1) |
|     if( alf_luma_filter_signal_flag ) { | |
|         ... | |
|     } | |
|     if( alf_chroma_filter_signal_flag ) { | |
|         ... | |
|     } | |
|     if ( alf_cross_component_joint_filter_signal_flag ) { | |
|         alf_cross_component_joint_filters_signaled_minus1 | ue(v) |
|         for (k = 0; k < (alf_cross_component_joint_filters_signaled_minus1+1); k++ ) { | |
|             for ( j = 0; j < 8; j++ ) | |
|                 alf_cross_component_joint_coeff_plus32[ k ][ j ] | u(6) |
|         } | |
|     } | |
| } | |

In the slice header, an APS index is signaled for both, chroma, components. A chroma CTB in the slice may choose a filter from the filter set in the APS.

```
if( ChromaArrayType != 0 )
    slice_cross_component_alf_cb_enabled_flag      u(1)
    slice_cross_component_alf_cr_enabled_flag      u(1)
    if( slice_cross_component_alf_cb_enabled_flag ||
slice_cross_component_alf_cr_enabled_flag) {
        slice_cross_component_alf_aps_id}          u(3)
```

Computational efficiency problems may arise when luma filters and/or chroma filters have coefficients of zero value, or some other value depending on their representation that causes a condition for the filters to effectively have coefficients of zero value. These computation efficiency problems may occur, for example, when the luma new filter value (i.e., the alf_luma_filter_signal_filter_flag) and the chroma new filter value (i.e., the alf_chroma_filter_signal_flag are enabled (e.g., equal to 1 in an ALF APS depending on the implementation). Similarly, computation efficiency problems may occur when the CC Cb chroma filter and/or CC Cr chroma filters have coefficients of zero value, or some other value depending on their representation that causes a condition for the filters to effectively have coefficients of zero value. In such a case, the computation efficiency problems may occur, for example, when the CC Cb chroma new filter value (i.e., the alf_cross_component_cb_filter_signal) and/or the CC Cr chroma new filter value (i.e., the alf_cross_component_cr_filter_signal) are enabled (e.g., equal to 1 in an ALF APS depending on the implementation).

These computational efficiency problems, for example, the decoder may crash or stop working because it is receiving too many coefficients which all have zero value or some representation that is effectively equivalent as having zero value. To address such problems, different solutions may be possible. Namely, as discussed above constraints may be added on the luma new filter value i.e., alf_luma_filter_signal_flag and the chroma new filter value (i.e., alf_chroma_filter_signal_flag). Similarly, it is also desirable to alleviate the computational efficiency problems by adding more constraints when the CC Cb chroma new filter value and the CC Cr chroma new filter value are signaled in an ALF APS.

The constraints can be implemented separately or combined. To illustrate the use of these constraints in the ALF APS more efficiently, different examples are discussed below. In a first example, it is envisioned that when at least one luma filter coefficient in one of the luma filters is non-zero, the luma new filter value is enabled. That is to say, that the luma new filter value (shown in FIG. 7A as alf_luma_new_filter_flag) should be enabled. Different configurations in different implementations may have the luma new filter value enabled by setting the flag to a 1 or a 0. In the example above, it is possible to determine if at least one luma filter coefficient in one of the luma filters is non-zero by taking the absolute value of the luma coefficients. For example, a check may be performed, such as, if at least one alf_luma_coeff_abs[i][j] is greater than a first threshold value (e.g., zero). There may be up to 25 luma filters in VVC and may be indexed with the variable I, thus the range of [i] is the number of filters where i=(0 . . . 24). Each luma filter may include 12 or 13 coefficients depending on implementation, where j=(0 . . . 12).

Figure 8A:
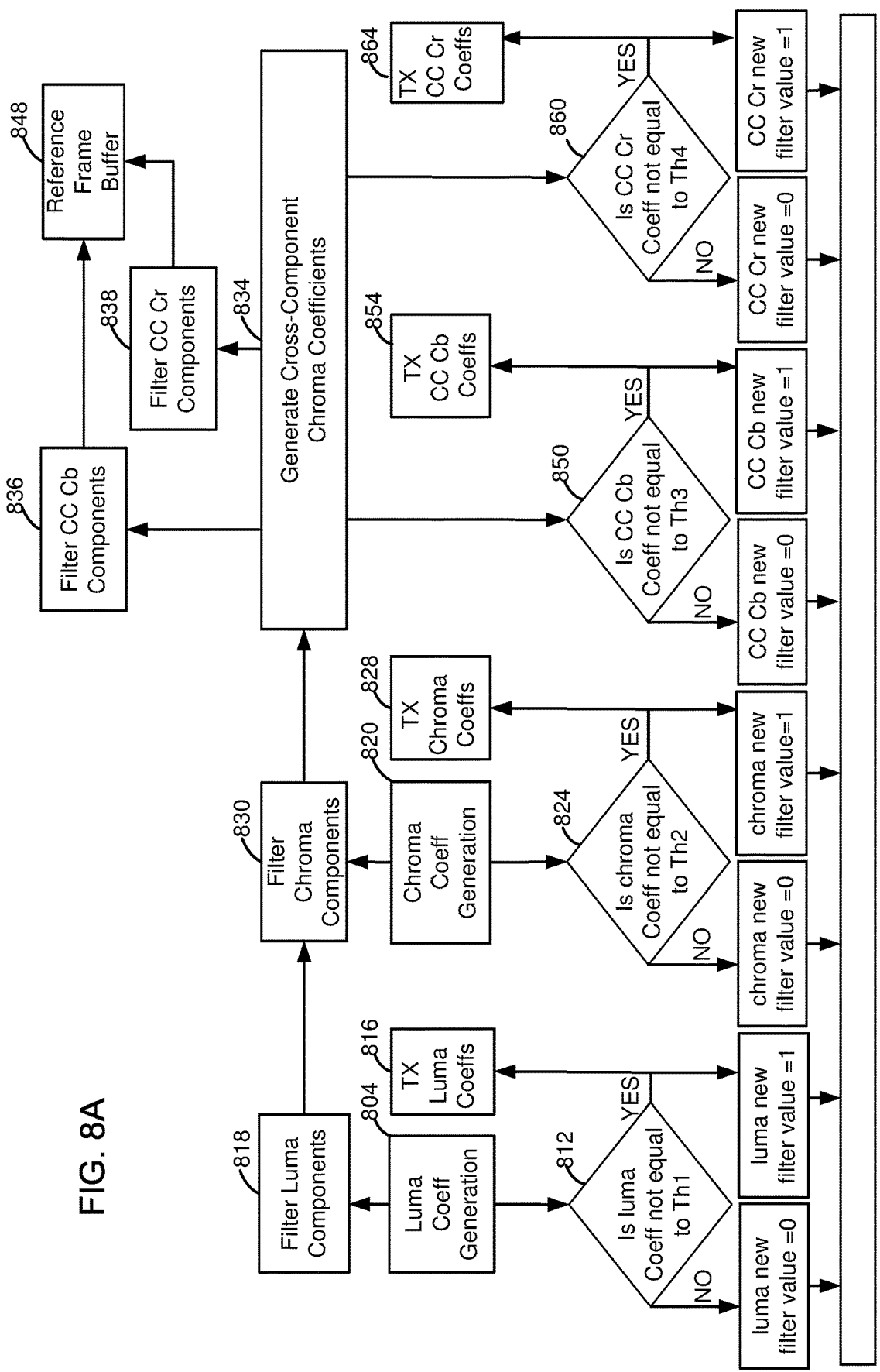
FIG. 8A is a flowchart that illustrates different constraints that may be applied in a video encoder device according to the techniques described in this disclosure.

FIG. 8A is an exemplary flowchart which illustrates different constraints that may be applied in the encoder device 20. The encoder device 20 may transmit parameters used in encoding video data. The encoder device may include one or more processors that are configured to access a current unit associated with more than one adaptation parameter set. The one or more processors may be configured to generate a plurality of sets of luma coefficients 804 of the video data associated with a plurality of luma filters in one of the adaptation parameter sets. The one or more processors may be configured to determine a luma new filter value associated with the plurality of luma filters (e.g., the 25 luma filters in VVC) in the adaptation parameter set, when comparing each luma coefficient in each luma filter in the plurality of luma filters, to a first threshold value 812. The first threshold value may be zero. However, there may be a representation of a value in an implementation which is offset from zero and in such a case the first threshold value may have a non-zero value but is effectively representing a zero value for a coefficient.

The one or more processors may be configured to enable the luma new filter value if at least one luma coefficient in each luma filter in the plurality of luma filters is not equal to the first threshold value. Then the one or more processors may be configured to transmit the luma new filter value and one or more sets of luma coefficients 816, in the plurality of luma filters, where at least one luma coefficient in each luma filter is not equal to the first threshold value.

To further illustrate, three luma filters may be represented as [0 0 0 0 0 0 0 0 0 0 0 0]; [1 0 0 0 0 0 0 0 0 0 0 0]; and [2 0 0 0 0 0 0 0 0 0 0 0]. The number within the brackets represent coefficients. The first filter contains all zeros. The second filter contains the value of 1 followed by zeros. The third filter contains the value of 2 followed by zeros. Based on the flowchart in FIG. 8A, the coefficients from the second filter and the coefficients from the third filter would be transmitted because if at least one luma coefficient in each luma filter in the plurality of luma filters is not equal to the first threshold value (e.g., "0") then the one or more sets (e.g., the second set of coefficients from the second filter and the third set of coefficients from the third filter) of luma coefficients 816, in the plurality of luma filters are transmitted.

However, the coefficients in the first filter which are all zero may also be transmitted. One reason is that the computational efficiency problems where the decoder may crash or stop working is a result of receiving too many coefficients which all have zero value (or some representation that is effectively zero value). As such, it is still possible to transmit the zero value coefficients from the first filter. That is to say, when the one or more processors are configured to transmit parameters used in encoding video data, additional one or more sets of luma coefficients in the plurality of luma filters, where all luma coefficients in each luma filter are equal to the first threshold value, may be transmitted in a bitstream, as long as, not all of the luma coefficients in all of the luma filters are equal to the first threshold value. In the three filter example above, not all of the luma coefficients in all (e.g., three filters) are equal to zero. The second and third filters contain at least one non-zero value, i.e., a "1" in the second filter, and a "2" in the third filter. However, if all of the luma coefficients are equal to a first threshold value (e.g., zero) the coefficients should not be transmitted because the decoder may stop working or may get disrupted for some time before it recovers. Thus, three filters that have all zero coefficients [0 0 0 0 0 0 0 0 0 0 0 0]; [0 0 0 0 0 0 0 0 0 0 0 0]; and [0 0 0 0 0 0 0 0 0 0 0 0] is not desirable and the constraints are in place to avoid this scenario from taking place in the encoder device 20. It should be noted that whether there are multiple luma filters where the luma coefficients are zero it is still possible to transmit the coefficients, as long as there are one or more luma filters that have at least one luma coefficient not equal to zero. The luma filters that have a zero value for their luma coefficients do not necessarily have to be transmitted in a particular order.

If the three filters all had coefficients with zero value, then the luma new value would not be enabled and none of the luma coefficients would be transmitted in the bitstream. However, the luma new filter value would be transmitted in the bitstream (e.g., disabled, which may have a value of zero depending on the implementation) so that a receiving decoder device 30 could determine that no coefficients for the luma filters are being received.

Another constraint illustrated in FIG. 8A is on the chroma coefficients. For example, it is envisioned that when at least one chroma coefficient is non-zero across all chroma filters that are configured through a syntax element, then the chroma new filter value is enabled. That is to say, in each signaled chroma filter at least one chroma coefficient should be non-zero. Different configurations in different implementations may have the chroma new filter value enabled by setting the flag to a 1 or a 0 depending on implementation.

In the example above, it is possible to determine if at least one chroma coefficient in one of the chroma filters is non-zero by taking the absolute value of the chroma coefficients. For example, a check may be performed, such as, if at least one alf_chroma_coeff_abs[i][j] is greater than a second threshold value (e.g., zero). There may be up to 8 chroma filters in VVC and may be indexed with the variable i, thus the range of [i] is the number of filters where i=(0 . . . 7). Each chroma filter may include 5 or 6 coefficients depending on implementation, where j=(0 . . . 5).

In addition to or alternatively to, the one or more processors being configured to transmit luma coefficients, the one or more processors may also be configured to generate a plurality of sets of chroma coefficients 820 of the video data associated with a plurality of (based on a condition in the encoder, or in a decoder via a syntax element) number of chroma filters in one of the adaptation parameter sets. The one or more processors may be configured to determine a chroma new filter value associated with the number of plurality of chroma filters (e.g., the 8 chroma filters in VVC) in the adaptation parameter set, when comparing each chroma coefficient in each chroma filter in the plurality of number of chroma filters, to a second threshold value 824. The second threshold value may be zero. However, there may be a representation of a value in an implementation which is offset from zero and in such a case the second threshold value may have a non-zero value but is effectively representing a zero value for a coefficient.

The one or more processors may be configured to enable the chroma new filter value if at least one chroma coefficient in each chroma filter in the plurality of number of chroma filters is not equal to the second threshold value. Then the one or more processors may be configured to transmit the chroma new filter value and one or more sets of chroma coefficients 828, in the plurality of chroma filters, where at least one chroma coefficient in each chroma filter is not equal to the second threshold value.

To further illustrate, different chroma filters may be represented as [0 0 0 0 0 0]; [1 0 0 0 0 0]; and [2 0 0 0 0 0]. The number within the brackets represent coefficients. The first filter contains all zeros. The second filter contains the value of 1 followed by zeros. The third filter contains the value of 2 followed by zeros. Based on the flowchart in FIG. 8A, the coefficients from the second filter and the coefficients from the third filter would be transmitted because if at least one chroma coefficient in each chroma filter in the plurality of chroma filters is not equal to the second threshold value (e.g., "0") then the one or more sets (e.g., the second set of coefficients from the second filter and the third set of coefficients from the third filter) of chroma coefficients 828, in the plurality of chroma filters are transmitted.

However, the coefficients in the first filter which are all zero may also be transmitted. One reason is that the computational efficiency problems where the decoder may crash or stop working is a result of receiving too many coefficients which all have zero value (or some representation that is effectively zero value). As such, it is still possible to transmit the zero value coefficients from the first filter. That is to say, when the one or more processors are configured to transmit parameters used in encoding video data, additional one or more sets of chroma coefficients in the plurality of chroma filters, where all chroma coefficients in each chroma filter are equal to the second threshold value, may be transmitted in a bitstream, as long as, not all of the chroma coefficients in all of the chroma filters are equal to the second threshold value. In the three filter example above, not all of the chroma coefficients in all (e.g., three filters) are equal to zero. The second and third filters contain at least one non-zero value, i.e., a "1" in the second filter, and a "2" in the third filter. However, if all of the chroma coefficients are equal to a second threshold value (e.g., zero) the coefficients should not be transmitted because the decoder may stop working or may get disrupted for some time before it recovers. Thus, three filters that have all zero coefficients [0 0 0 0 0 0]; [0 0 0 0 0 0 0]; and [0 0 0 0 0 0] is not desirable and the constraints are in place to avoid this scenario from taking place in the encoder device 20. It should be noted that whether there are multiple chroma filters where the chroma coefficients are zero it is still possible to transmit the coefficients, as long as there are one or more chroma filters that have at least one chroma coefficient not equal to zero. The chroma filters that have a zero value for their chroma coefficients do not necessarily have to be transmitted in a particular order.

As another example, suppose there are six chroma filters that have been configured, i.e., used as part of encoding a particular coding unit. For illustration purposes, the six chroma filters may be: [1 2 3 4 5 6]; [2 3 4 1 7 −3]; [1 0 3 4 −4 −1]; [2 3 −3 −2 4 1; [0 0 0 0 0 0]; [−1 0 0 0 0 0]. As discussed above, in the three chroma filter example, the chroma coefficients for all these six filters would be transmitted because there at least one chroma coefficient that is not zero in each chroma filter, except for the fifth chroma filter [0 0 0 0 0 0] which contains all zeros. However, because not all of the six filters have all zero's for coefficients, the coefficients in the fifth chroma filter are also transmitted. If the six filters all had coefficients with zero value, then the chroma new value would not be enabled and none of the chroma coefficients would be transmitted in the bitstream. However, the chroma new filter value would be transmitted in the bitstream (e.g., disabled, which may have a value of zero depending on the implementation) so that a receiving decoder device 30 could determine that no coefficients for the chroma filters are being received.

In addition to or alternatively to, the one or more processors being configured to transmit luma coefficients, the one or more processors may also be configured to generate a plurality of sets of cross component (CC) Cb chroma coefficients 834 of the video data associated with a plurality of (based on a condition in the encoder, or in a decoder via a syntax element) number of CC Cb chroma filters in one of the adaptation parameter sets. The one or more processors may be configured to determine a CC Cb chroma new filter value associated with the number of plurality of CC Cb chroma filters in the adaptation parameter set, when comparing each CC Cb chroma coefficient in each CC Cb chroma filter in the plurality of number of CC Cb chroma filters, to a third threshold value 850. The third threshold value may be zero or a representation of a value in an implementation which is offset from zero and in such a case the third threshold value may have a non-zero value but is effectively representing a zero value for a coefficient. For example, when the CC Cb new filter value (i.e., alf_cross_component_cb_filter_signal_flag is enabled (e.g., equal to 1 depending on the implementation)), for each signaled cross-component filter for Cb component, at least one coefficient should be larger than the third threshold. Further elaborating on this example, there may be an offset of 32, or some other number present. Currently, the offset is 32. Thus, what is checked is that for each alf_cross_component_cb_coeff_plus32[k] at least one coefficient is not equal to 32 instead zero. The range of [k] is from 0 to CC Cb filter signaled minus 1 (e.g., alf_cross_component_cb_filters_signaled_minus1). Similarly, at least one CC Cb coeffplus32 coefficient (e.g., alf_cross_component_cb_coeff_plus32[k][j]) is not equal to 32. The range of [j] is up to a fixed number, e.g. 8.

The one or more processors may be configured to enable the CC Cb chroma new filter value if at least one CC Cb chroma coefficient in each CC Cb chroma filter in the plurality of number of CC Cb chroma filters is not equal to the third threshold value. Then the one or more processors may be configured to transmit the CC Cb chroma new filter value and one or more sets of CC Cb chroma coefficients 854, in the plurality of CC Cb chroma filters, where at least one CC Cb chroma coefficient in each CC Cb chroma filter is not equal to the third threshold value.

To further illustrate, different CC Cb chroma filters may be represented as [0 0 0 0 0 0]; [1 0 0 0 0 0]; and [2 0 0 0 0 0]. The number within the brackets represent coefficients. The first filter contains all zeros. The second filter contains the value of 1 followed by zeros. The third filter contains the value of 2 followed by zeros. Based on the flowchart in FIG. 8A, the coefficients from the second filter and the coefficients from the third filter would be transmitted because if at least one chroma coefficient in each chroma filter in the plurality of chroma filters is not equal to the second threshold value (e.g., "0") then the one or more sets (e.g., the second set of coefficients from the second filter and the third set of coefficients from the third filter) of CC Cb chroma coefficients 854, in the plurality of CC Cb chroma filters are transmitted.

However, the coefficients in the first filter which are all zero may also be transmitted. One reason is that the computational efficiency problems where the decoder may crash or stop working is a result of receiving too many coefficients which all have zero value (or some representation that is effectively zero value). As such, it is still possible to transmit the zero value coefficients from the first filter. That is to say, when the one or more processors are configured to transmit parameters used in encoding video data, additional one or more sets of CC Cb chroma coefficients in the plurality of CC Cb chroma filters, where all chroma coefficients in each CC Cb chroma filter are equal to the second threshold value, may be transmitted in a bitstream, as long as, not all of the chroma coefficients in all of the chroma filters are equal to the third threshold value. In the three filter example above, not all of the CC Cb chroma coefficients in all (e.g., three filters) are equal to zero. The second and third filters contain at least one non-zero value, i.e., a "1" in the second filter, and a "2" in the third filter. However, if all of the CC Cb chroma coefficients are equal to a third threshold value (e.g., zero) the CC Cb coefficients should not be transmitted because the decoder may stop working or may get disrupted for some time before it recovers. Thus, three filters that have all zero coefficients [0 0 0 0 0 0]; [0 0 0 0 0 0]; and [0 0 0 0 0 0] is not desirable and the constraints are in place to avoid this scenario from taking place in the encoder device 20. It should be noted that whether there are multiple CC Cb chroma filters where the CC Cb chroma coefficients are zero it is still possible to transmit the coefficients, as long as there are one or more CC Cb chroma filters that have at least one chroma coefficient not equal to zero. The CC Cb chroma filters that have a zero value for their CC Cb chroma coefficients do not necessarily have to be transmitted in a particular order.

As another example, suppose there are six CC Cb chroma filters that have been configured, i.e., used as part of encoding a particular coding unit. For illustration purposes, the six CC Cb chroma filters may be: [1 2 3 4 5 6]; [2 3 4 1 7 −3]; [1 0 3 4 −4 −1]; [ 2 3 −3 −2 4 1; [0 0 0 0 0 0]; [−1 0 0 0 0 0]. As discussed above, in the three CC Cb chroma filter example, the CC Cb chroma coefficients for all these six filters would be transmitted because there at least one CC Cb chroma coefficient that is not zero in each CC Cb chroma filter, except for the fifth CC Cb chroma filter [0 0 0 0 0 0] which contains all zeros. However, because not all of the six filters have all zero's for coefficients, the coefficients in the fifth CC Cb chroma filter are also transmitted. If the six filters all had coefficients with zero value, then the CC Cb chroma new value would not be enabled and none of the CC Cb chroma coefficients would be transmitted in the bitstream. However, the CC Cb chroma new filter value would be transmitted in the bitstream (e.g., disabled, which may have a value of zero depending on the implementation) so that a receiving decoder device 30 could determine that no coefficients for the CC Cb chroma filters are being received.

The flow in FIG. 8A is similar to that described above for the CC Cb coefficients. That is to say, the one or more processors may be configured to enable the CC Cr chroma new filter value if at least one CC Cr chroma coefficient in each CC Cr chroma filter in the plurality of number of CC Cr chroma filters is not equal to the fourth threshold value. Then the one or more processors may be configured to transmit the CC Cr chroma new filter value and one or more sets of CC Cr chroma coefficients 864, in the plurality of CC Cr chroma filters, where at least one CC Cr chroma coefficient in each CC Cr chroma filter is not equal to the fourth threshold value.

In addition to or alternatively to, the one or more processors being configured to transmit luma coefficients, the one or more processors may also be configured to generate a plurality of sets of CC Cr chroma coefficients 834 of the video data associated with a plurality of (based on a condition in the encoder, or in a decoder via a syntax element) number of CC Cr chroma filters in one of the adaptation parameter sets. The one or more processors may be configured to determine a CC Cr chroma new filter value associated with the number of plurality of CC Cr chroma filters in the adaptation parameter set, when comparing each CC Cr chroma coefficient in each CC Cr chroma filter in the plurality of number of CC Cr chroma filters, to a fourth threshold value 860. The fourth threshold value may be zero or a representation of a value in an implementation which is offset from zero and in such a case the fourth threshold value may have a non-zero value (e.g., 32 as discussed below) but is effectively representing a zero value for a coefficient.

For example, when the CC Cr new filter value (i.e., alf_cross_component_cr_filter_signal_flag is enabled (e.g., equal to 1 depending on the implementation)), for each signaled cross-component filter for Cr component, at least one coefficient should be larger than the fourth threshold. Further elaborating on this example, there may be an offset of 32 or some other number present. Currently, the offset is 32. Thus, what is checked is that for each alf_cross_component_cr_coeff_plus32[k] at least one coefficient is not equal to 32 instead zero. The range of [k] is from 0 to alf_cross_component_cr_filters_signaled_minus1. Similarly, at least one alf_cross_component_cr_coeff_plus32[k][j] is not equal to 32. The range of [j] is up to a fixed number, e.g. 8.

Describing other elements in FIG. 8A, once the luma coefficients have been generated 804, one of the luma filters (e.g., up to 25 filters in VVC) may filter the luma components 818 of the video data in the encoder device 20. The output of the luma filters is sent to one or more chroma filters. The one or more chroma filters filter the chroma components where the chroma coefficients that have been generated 820. The number of chroma filters may be configurable, and not necessarily the maximum number of chroma filters are used (e.g., in VVC there may be up to 8 chroma filters). In addition, after the filtering of the chroma components of the video data 830, cross component (CC) chroma coefficients 834 are generated and used to filter the CC Cb chroma components 836 and used to filter the CC Cr chroma components 838. The output of both those CC chroma filtering operations may be stored in a reference frame buffer 848.

Figure 8B:
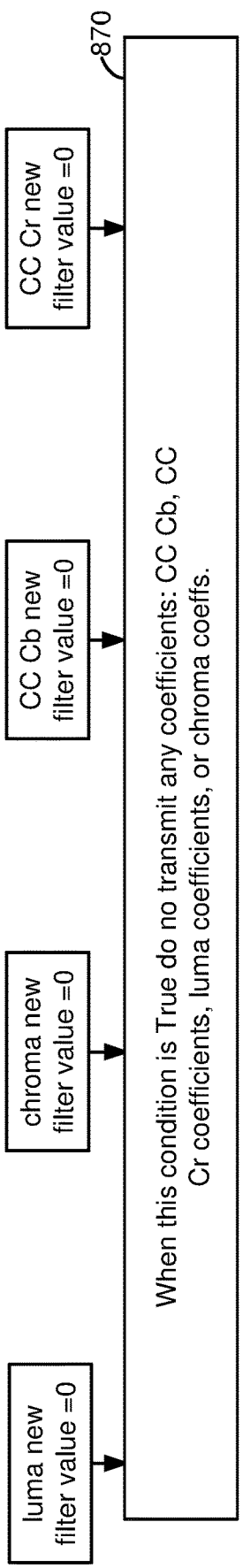
FIG. 8B illustrates another constraint to help solve the computation efficiency problems according to the techniques described in this disclosure.

FIG. 8B illustrates another constraint to help solve the computation efficiency problems. Namely, as mentioned above, when the luma new filter value and the chroma new filter value are both disabled all of the luma coefficients in all the luma filters and all of the chroma coefficients in each chroma filter have a zero value. In such a case the luma and chroma coefficients are not transmitted in the bitstream. In addition, or alternatively to that constraint, FIG. 8B also illustrates that a similar constraint is applied to the CC Cb chroma coefficients and CC Cr chroma coefficients. Namely, that when the CC Cb chroma new filter value and the CC Cr chroma new filter value are both disabled during the accessing of the current unit at the same time, i.e., during the bitstream in the same frame, all of the CC Cb chroma coefficients in in each CC Cb chroma filter have a zero value and all of the CC Cr chroma coefficients in in each CC Cr chroma filter have a zero value. In such a case the CC Cb chroma coefficients and the CC Cr chroma coefficients are not transmitted in the bitstream. In addition to or alternatively, an APS_type APS_ALF is not transmitted in the bitstream when this constraint is present.

In another example, when a slice/block is referencing the CCALF filter sets of CC Cb component in an ALF APS, the ALF APS shall have signaled CC Cb coefficients. The unit being accessed is a slice and the slice is referencing cross-component chroma coefficients in the adaptation parameter set, the cross-component chroma coefficients are transmitted in the bitstream. The value of CC Cb new filter value (e.g., alf_cross_component_cb_filter_signal_flag) of the APS NAL unit having an APS_type (e.g., aps_params_type) equal to ALF_APS and the APS ID (e.g., adaptation_parameter_set_id) being equal to the slice_cross_component_alf_cb_aps_id is enabled (depending on the implementation that may be a 1 or 0). As such, when this constraint is present the (alf_cross_component_cb_filter_signal_flag is disabled), and the CCALF is not applied to the Cb CTBs which are referenced in this APS. 17A.

In yet another example, when a slice/block is referencing the CCALF filter sets of Cr component in an ALF APS, the ALF APS signals CC Cr coefficients. The unit being accessed is a slice and the slice is referencing cross-component chroma coefficients in the adaptation parameter set, the cross-component chroma coefficients are transmitted in the bitstream. Thus, when the CC Cr new filter value of the APS NAL unit having an APS type (e.g., aps_params_type) equal to ALF_APS, and APS ID (e.g., adaptation_parameter_set_id) is equal to the slice_cross_component_alf_cr_aps_id is enabled (depending on the implementation that may be a 1 or 0). As such, when this constraint is present the CC Cb new filter value should not be enabled, and the CCALF is not applied to the Cr CTB s which are referenced in this APS.

Figure 8C:
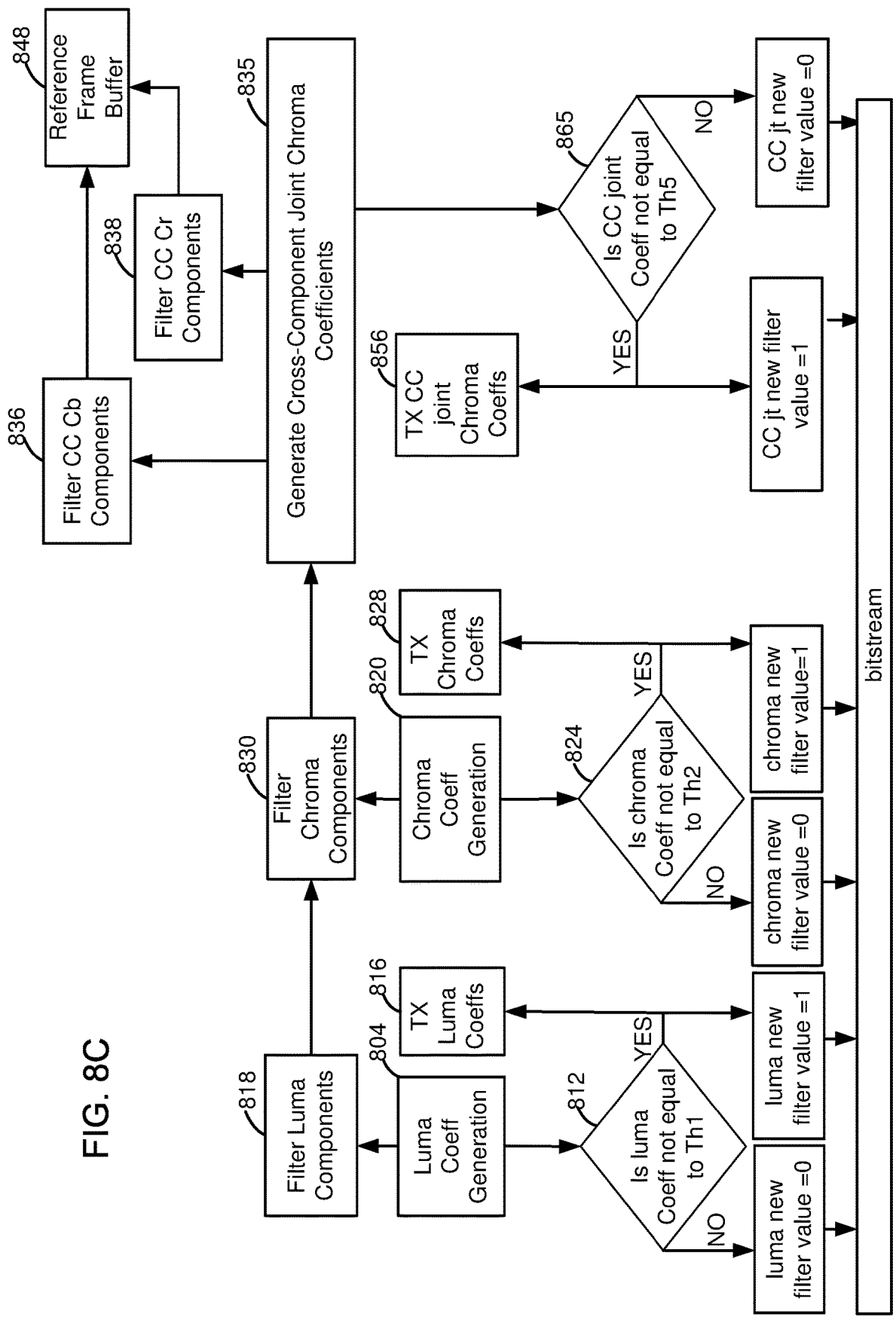
FIG. 8C is a flowchart that illustrates different constraints that may be applied in a video encoder device according to the techniques described in this disclosure including relating to joint chroma filters.

The flowchart in FIG. 8C is similar to that described above for FIG. 8A, except that the CC Cb chroma filters and CC Cr chroma filters may have joint Cb and Cr filter sets.

That is to say, the one or more processors may be configured to enable the CC joint chroma new filter value if at least one CC joint chroma coefficient in each CC joint chroma filter in the plurality of number of CC joint chroma filters is not equal to the fifth threshold value. Then the one or more processors may be configured to transmit the CC joint chroma new filter value and one or more sets of CC joint chroma coefficients 865, in the plurality of CC joint chroma filters, where at least one CC joint chroma coefficient in each CC joint chroma filter is not equal to the fifth threshold value.

In addition to, or alternatively to, the one or more processors being configured to transmit luma coefficients, the one or more processors may also be configured to generate a plurality of sets of CC joint chroma coefficients 835 of the video data associated with a plurality of (based on a condition in the encoder, or in a decoder via a syntax element) number of CC joint chroma filters in one of the adaptation parameter sets. The one or more processors may be configured to determine a CC joint chroma new filter value associated with the number of plurality of CC Cr chroma filters in the adaptation parameter set, when comparing each CC joint chroma coefficient in each CC joint chroma filter in the plurality of number of CC joint chroma filters, to a fifth threshold value 865. The fifth threshold value may be zero or a representation of a value in an implementation which is offset from zero and in such a case the fifth threshold value may have a non-zero value (e.g., 32 as discussed below) but is effectively representing a zero value for a coefficient.

For example, when the CC joint new filter value (i.e., alf_cross_component_joint_filter_signal_flag (CC joint new filter value) is enabled (e.g., equal to 1 depending on the implementation), for each signaled cross-component filter for Cr component, at least one coefficient should be larger than the fourth threshold. Further elaborating on this example, there may be an offset of 32, or some other number present. Currently, the offset is 32. Thus, what is checked is that for each alf_cross_component_joint_coeff_plus32[k] at least one coefficient is not equal to 32 instead zero.

The range of [k] is from 0 to alf_cross_component_cr_filters_signaled_minus1. Similarly, at least one alf_cross_component_joint_coeff_plus32[k][j] is not equal to 32. The range of [j] is up to a fixed number, e.g. 8.

It should also be noted that similar to what was described in FIG. 8B, the joint chroma coefficients may not be transmitted in the bitstream if the values of alf_luma_filter_signal_flag (luma new filter value), alf_chroma_filter_signal_flag (chroma new filter value), and the alf_cross_component_joint_filter_signal_flag (CC joint new filter value) may not be enabled during the accessing of the coding unit at the same time. As such, CC Cb coefficients, luma coefficients or joint chroma coefficients that are part of the ALF process are transmitted in the bitstream when this constraint is present.

In another example, when a slice is referencing a CCALF filter set in an ALF APS, the ALF APS shall have signaled CCALF coefficients. Referring to FIG. 7B, the value of alf_cross_componentjoint_filter_signal_flag (4) of the APS NAL unit having aps_params_type (1a) equal to ALF_APS (an APS_type (1a) and adaptation_parameter_set_id (1) equal to slice_cross_component_alf_aps_id (2i) should be enabled (depending on the implementation that may be a 1 or 0). As such, when this constrain is present (alf_cross_component_joint_filter_signal_flag is disabled, i.e., the CCALF_joint_ctb_enable flag(2) in FIG. 7B is disabled), the CCALF is not applied to the chroma CTBs which are referenced in this APS. Note an APS_type may be an ALF_APS, LMCS_APS, scaling_matrix, or other type).

Figure 8D:
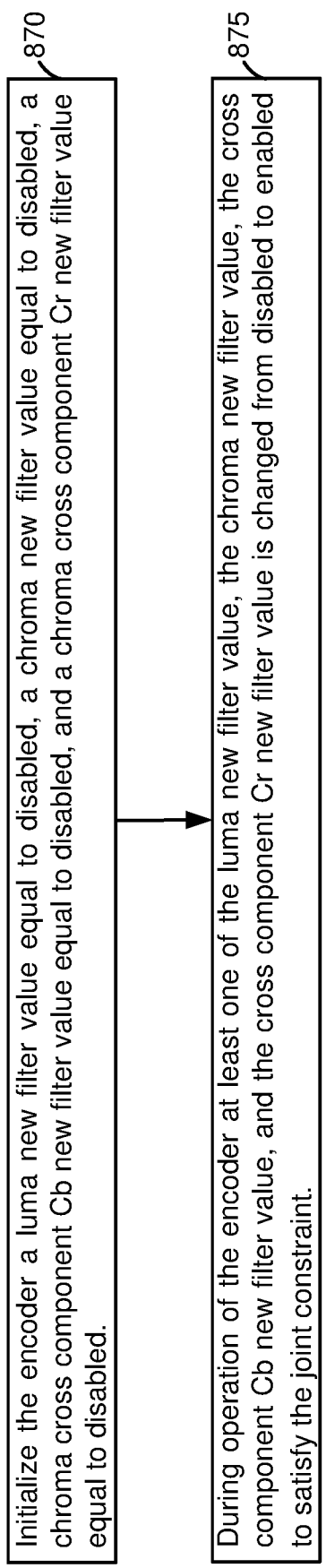
FIG. 8D illustrates another constraint to help solve the computation efficiency problems according to the techniques described in this disclosure.

FIG. 8D illustrates another constraint to help solve the computation efficiency problems according to the techniques described in this disclosure. In an alternative embodiment, an encoder may be initialized with a luma new filter value equal to disabled, a chroma new filter value equal to disabled, a chroma cross component Cb new filter value equal to disabled, and a chroma cross component Cr new filter value equal to disabled 870. As such, there is a joint constraint that these four new filter values not all be disabled in bitstream within the same frame.

Each of these new filter values may be located in an adaptation parameter set. In addition, as illustrated in FIG. 7A, an adaptation parameter set includes an adaptation parameter set ID. Thus, in some examples, each APS ID may have its own new filter values and each of these new filter values: luma new filter value, a chroma new filter value, chroma cross component Cb new filter value, and a chroma cross component Cr new filter value in each APS may all be initialized with their values equal to disabled. During operation of the encoder, at least one of the luma new filter value, the chroma filter value, the cross component Cb new filter value, and the cross component Cr new filter value may be changed from disabled to enabled to satisfy the joint constraint 875.

Note, in some implementation zero indicates that a new filter value is disabled. In other implementations where a one indicates that a new filter value is disabled, all four new filter values may not equal one in a bitstream within a same frame.

Figure 8E:
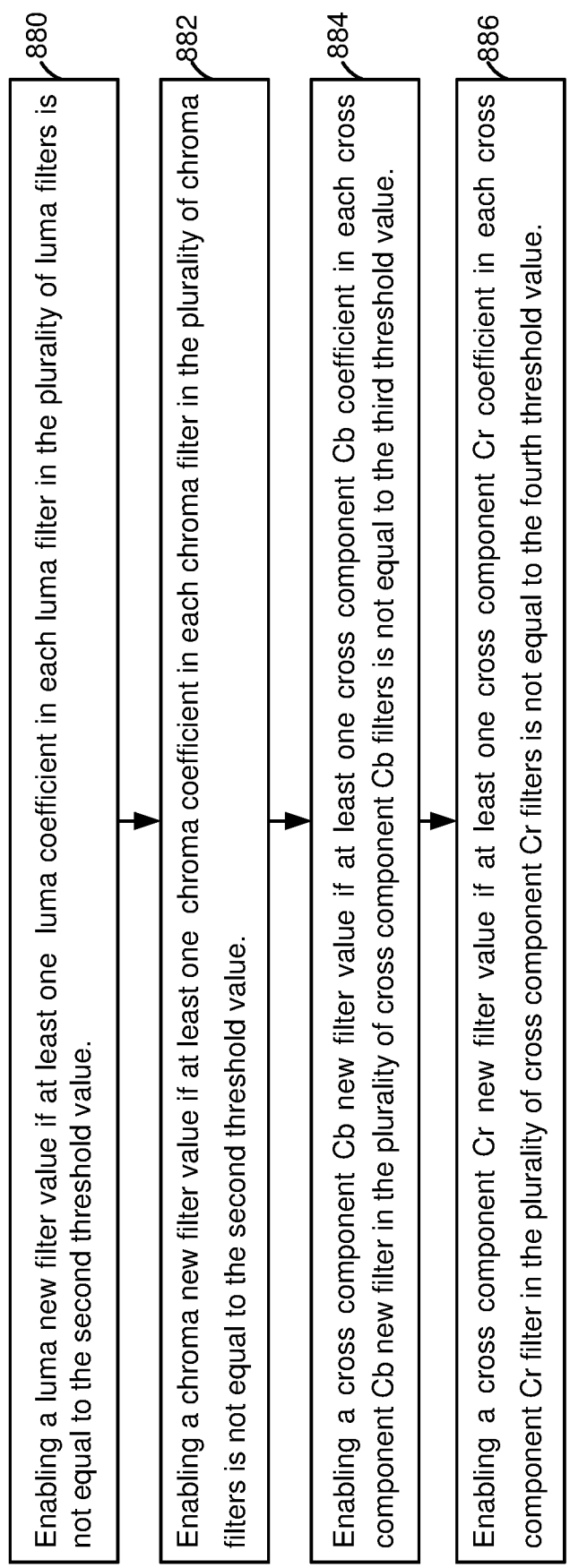
FIG. 8E illustrates another constraint to help solve the computation efficiency problems according to the techniques described in this disclosure.

FIG. 8E illustrates another constraint to help solve the computation efficiency problems according to the techniques described in this disclosure. In addition to or as an alternative to the embodiment described in FIG. 8D, there may be an instance where there is an enabling the luma new filter value if at least one luma coefficient in each luma filter in the plurality of filters of luma filters in an APS is not equal to a first threshold value 880, e.g., the first threshold value may be equal to zero. Similarly, there may be an instance of enabling the chroma new filter value if at least one chroma coefficient in each chroma filter in the plurality of chroma filters of an APS is not equal to a second threshold value 882, e.g., the second threshold value may be equal to zero. In addition, there may be an instance of enabling the cross component Cb chroma new filter value if at least one cross component Cb chroma coefficient in each cross component Cb chroma filter in the plurality of cross component Cb chroma filters of an APS is not equal to a third threshold value 884, e.g., the third threshold value may be equal to zero. Moreover, there may be an instance of enabling the cross component Cr chroma new filter value if at least one cross component Cr chroma coefficient in each cross component Cr chroma filter in the plurality of cross component Cr chroma filters of an APS is not equal to a fourth threshold value 886, e.g., the fourth threshold value may be equal to zero. In some examples, each APS associated with different APS ID may include instances where the new filter values: luma new filter value, chroma filter value, cross component Cb chroma filter value, are all equal to the same threshold. For example, the threshold may be zero.

Figure 9A:
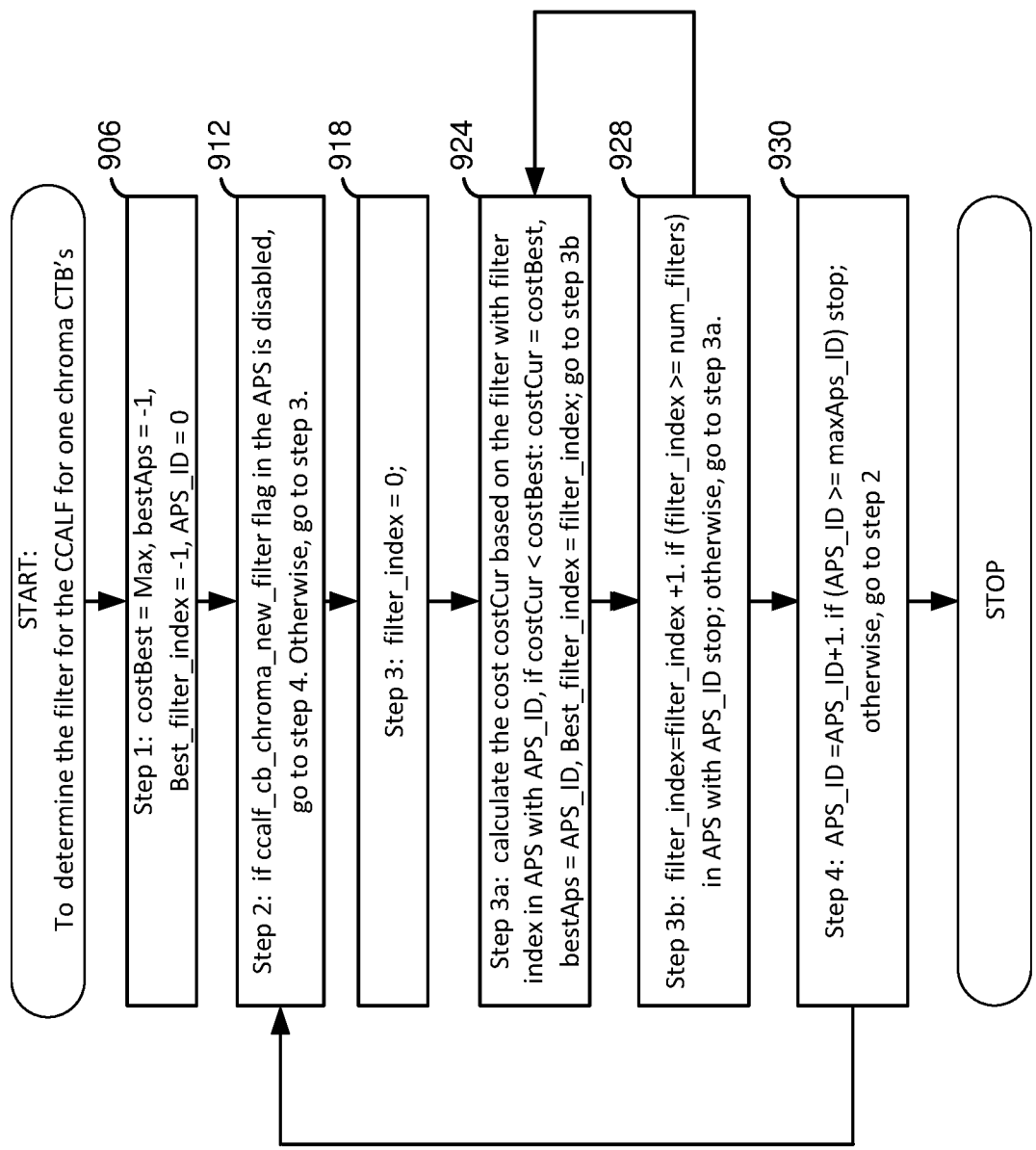
FIG. 9A is a flowchart that illustrates a process that may be performed by a video encoder device to determine the filter for the cross component for one chroma coding tree block according to the techniques described in this disclosure.

FIG. 9A is a flowchart that illustrates a process that may be performed by the encoder device 20 to determine the filter for the cross component (CCALF) for one chroma coding tree block. In Step 1 906 the best cost function is stored (e.g. costBest=Max, bestAps=−1), and the best filter index is stored along with initializing the APS to zero. In Step 2 912 if a CC Cb chroma new filter value (e.g., ccalf_cb_new_filter_flag) in the APS is disabled, then go to step 4, otherwise, go to step 3. In step 3 918 the filter index (e.g., ccalf_filter_index is initialized to zero).

In step 3a 924, calculate the cost current (e.g., costCur) based on the filter with filter index in APS with the current APS identification (e.g., APS_ID). If the current cost function is less than the best cost function up to that point then updated the current cost function and make it the best cost function (e.g., if costCur<costBest: costCur=costBest). In addition, also update the best APS with the current APS identification (e.g, bestAps=APS_ID) and the best filter index with the current filter index (e.g, Best_filter_index=filter_index), then go to step 3b.

In Step 3b 928 update the filter index to move to the next filter (e.g., filter_index=filter_index+1). If the filter index is greater than or equal to the max number of filters (e.g., num_filters) then stop (e.g., if (filter_index>=num_filters) in APS with APS_ID), otherwise repeat and go to step 3a. In step 4 930, the current APS identification is incremented to move to the next APS (e.g. APS_ID=APS_ID+1). If the current APS identification is at the maxAPS then stop (e.g., if (APS_ID>=maxAps_ID) stop), otherwise, go to step 2.

Figure 9B:
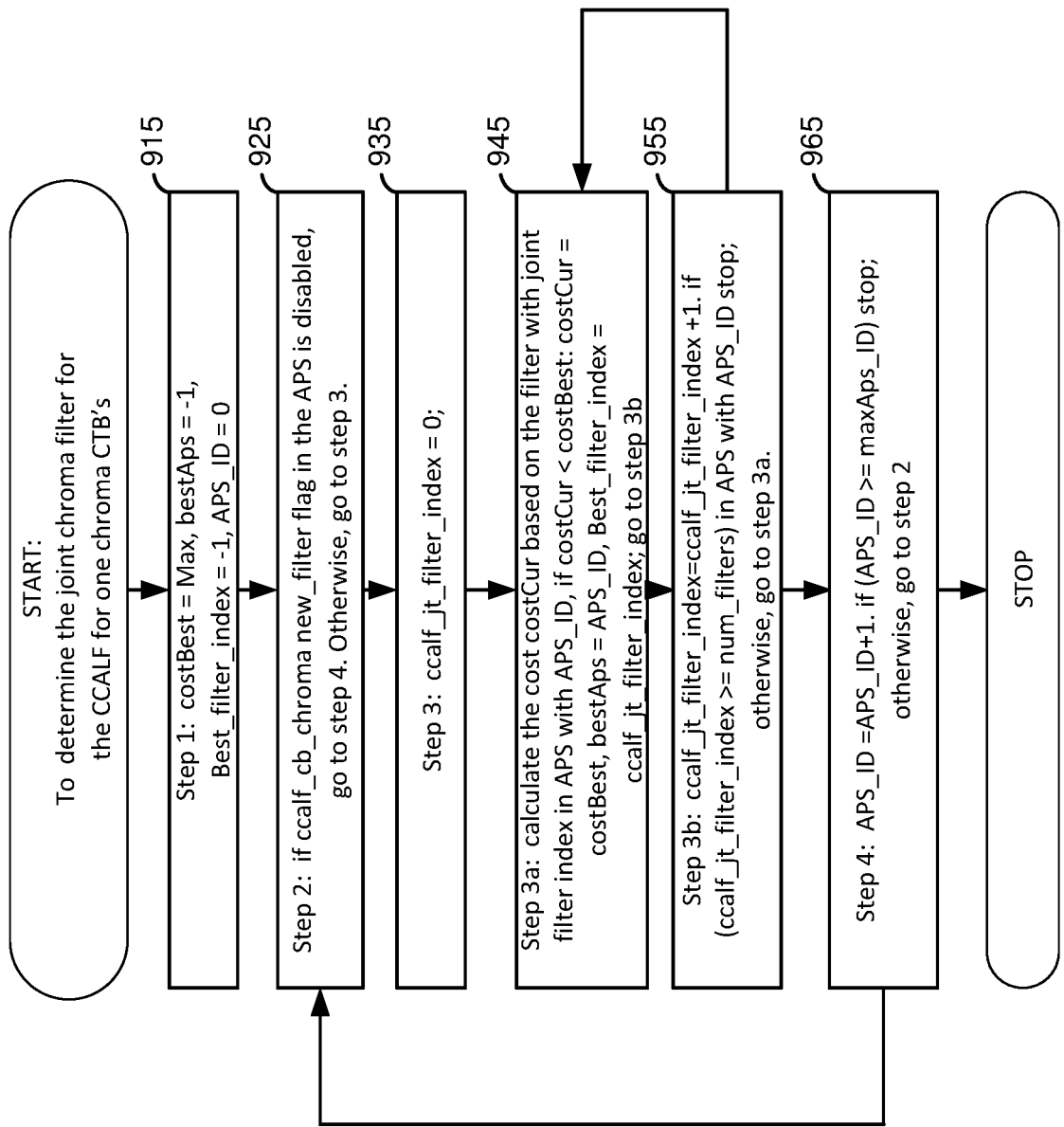
FIG. 9B is a flowchart that illustrates a process that may be performed by a video encoder device to determine the joint chroma filter for the cross component for one chroma coding tree block according to the techniques described in this disclosure.

FIG. 9B is a flowchart that illustrates a process that may be performed by the encoder device 20 to determine the joint chroma filter for the cross component (CCALF) for one chroma coding tree block. In Step 1 915 the best cost function is stored (e.g. costBest=Max, bestAps=−1), and the best filter index is stored along with initializing the APS to zero. In Step 2 925 if a CC Cb chroma new filter value (e.g., ccalf_cb_new_filter_flag) in the APS is disabled, then go to step 4, otherwise, go to step 3. In step 3 935 the cross component joint chroma filter index (e.g., ccalf_jt_filter_index is initialized to zero).

In step 3a 945, calculate the cost current (e.g., costCur) based on the filter with filter index in APS with the current APS identification (e.g., APS_ID). If the current cost function is less than the best cost function up to that point then updated the current cost function and make it the best cost function (e.g., if costCur<costBest: costCur=costBest). In addition, also update the best APS with the current APS identification (e.g, bestAps=APS_ID) and the best filter index with the current filter index (e.g, Best_filter_index=filter_index), then go to step 3b.

In Step 3b 955 update the filter index to move to the next filter (e.g., filter_index=filter_index+1). If the filter index is greater than or equal to the max number of filters (e.g., num_filters) then stop (e.g., if (filter_index>=num_filters) in APS with APS_ID), otherwise repeat and go to step 3a. In step 4 965, the current APS identification is incremented to move to the next APS (e.g. APS_ID=APS_ID+1). If the current APS identification is at the maxAPS then stop (e.g., if (APS_ID>=maxAps_ID) stop), otherwise, go to step 2.

Figure 10A:
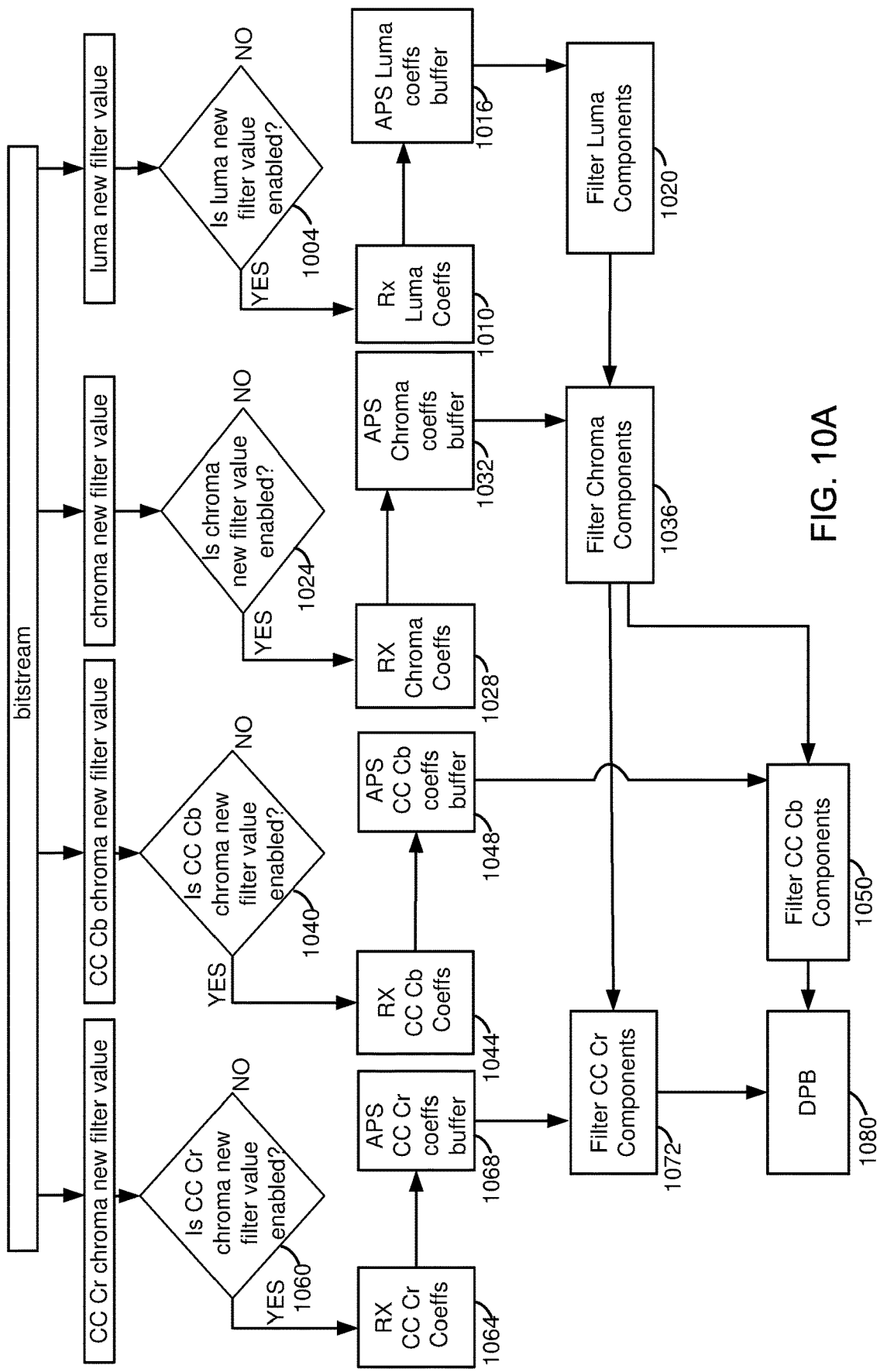
FIG. 10A is a flowchart that illustrates a process that may be performed by a video decoder device according to the techniques described in this disclosure.

FIG. 10A is a flowchart that illustrates a process that may be performed by the decoder device 30. Not all the steps in the flowchart are necessarily required to be performed by the decoder device 30. 1C. The decoder device 30 may receive parameters used in decoding video data. The decoder device 30 may include one or more processors configured to receive parameters in a bitstream that includes a luma new filter value, compressed video data, and one or more other parameters. The one or more processors may be configured to decompress the compressed video data to generate decompressed video data. The one or more processors may be configured to determine that if the luma new filter value is enabled 1004, the one or more other parameters includes received luma coefficients 1010 that are stored in an adaptive parameter set luma coefficients buffer 1016. The one or more processors are configured to filter luma components 1020 of the decompressed video data as part of an adaptation loop filter process, to generate decoded video data. The one or more processors may be configured to store the decoded video data in decoder picture buffer 1080 based on the filtering of the luma components 1020 of the decoded video data.

Moreover, the one or more other parameters may include a chroma new filter value. The one or more processors may be configured to determine that if the chroma new filter value is enabled 1024, the one or more other parameters includes received chroma coefficients 1028 that are stored in an adaptive parameter set chroma coefficients buffer 1032. The one or more processors may be configured to filter chroma components 1036 of the decompressed video data as part of an adaptation loop filter process. The one or more processors may be configured to store the decoded video data in decoder picture buffer 1080 based on the filtering of the chroma components 1036 of the decoded video data.

In addition, in another example, the one or more other parameters may include a cross component Cb chroma new filter value. The one or more processors may be configured to determine that if the cross component Cb chroma new filter value is enabled 1040, the one or more other parameters includes received Cb chroma coefficients 1044. The one or more processors may be configured to store the received Cb chroma coefficients 1044 in an adaptive parameter set Cb chroma coefficients buffer 1048. The one or more processors may be configured to filter cross component Cb chroma components 1050 of the decompressed video data as part of an adaptation loop filter process. The one or more processors may be configured to store the decoded video data in decoder picture buffer 1080 based on the filtering of the cross component Cb chroma components 1050 of the decoded video data.

In addition, in another example, the one or more other parameters may include a cross component Cr chroma new filter value. The one or more processors may be configured to determine that if the cross component Cr chroma new filter value is enabled 1060, the one or more other parameters includes received chroma Cr coefficients 1064. The one or more processors may be configured to store in an adaptive parameter set chroma Cr coefficients buffer 1068. The one or more processors may be configured to filter cross component Cr chroma components 1072 of the decompressed video data as part of an adaptation loop filter process. In addition, the one or more processors may be configured to store the decoded video data in decoder picture buffer 1080 based on filtering of the cross component Cr chroma components 1072 of the decoded video data.

Describing other elements in FIG. 10A, once the luma coefficients have been received 1010 and stored in the APS luma coefficient buffer 1016, one of the luma filters may filter the luma components 1020 of the video data in the decoder device 20. The output of the luma filters is sent to one or more chroma filters. The one or more chroma filters (which may be implemented in the one or more processors) received 1028 may filter the chroma components 1036. The number of chroma filters may be configurable, and not necessarily the maximum number of chroma filters are used (e.g., in VVC there may be up to 8 chroma filters).

In addition, after the filtering of the chroma components of the video data 1036, cross component (CC) chroma coefficients received 1044 may be used to filter the CC Cb chroma components 1050 and also may be used to filter the CC Cr chroma components 1072. The output of both those CC chroma filtering operations 1050, 1072 may be stored in decoder picture buffer (DPB) 1080.

It should be noted that in some implementation zero indicates that a new filter value is disabled. In other implementations where a one indicates that a new filter value is disabled, all four new filter values may not equal one in a bitstream within a same frame. A decoder implemented according to FIG. 10A, may include a memory configured to store compressed video data. The decoder may also include one or more processors, coupled to the memory, configured to receive a bitstream that includes a luma new filter value, a chroma new filter value, a cross component Cb chroma new filter value, a cross component Cr chroma new filter value, the compressed video data. The luma new filter value, the chroma new filter value, the cross component Cb chroma new filter value, the cross component Cr chroma new filter value having been transmitted by an encoder, and consequently received at the decoder subject to a joint constraint that not all of the luma new filter value, the chroma new filter value, the cross component Cb chroma new filter value, the cross component Cr chroma new filter value are equal to disabled in a bitstream within a same frame.

Figure 10B:
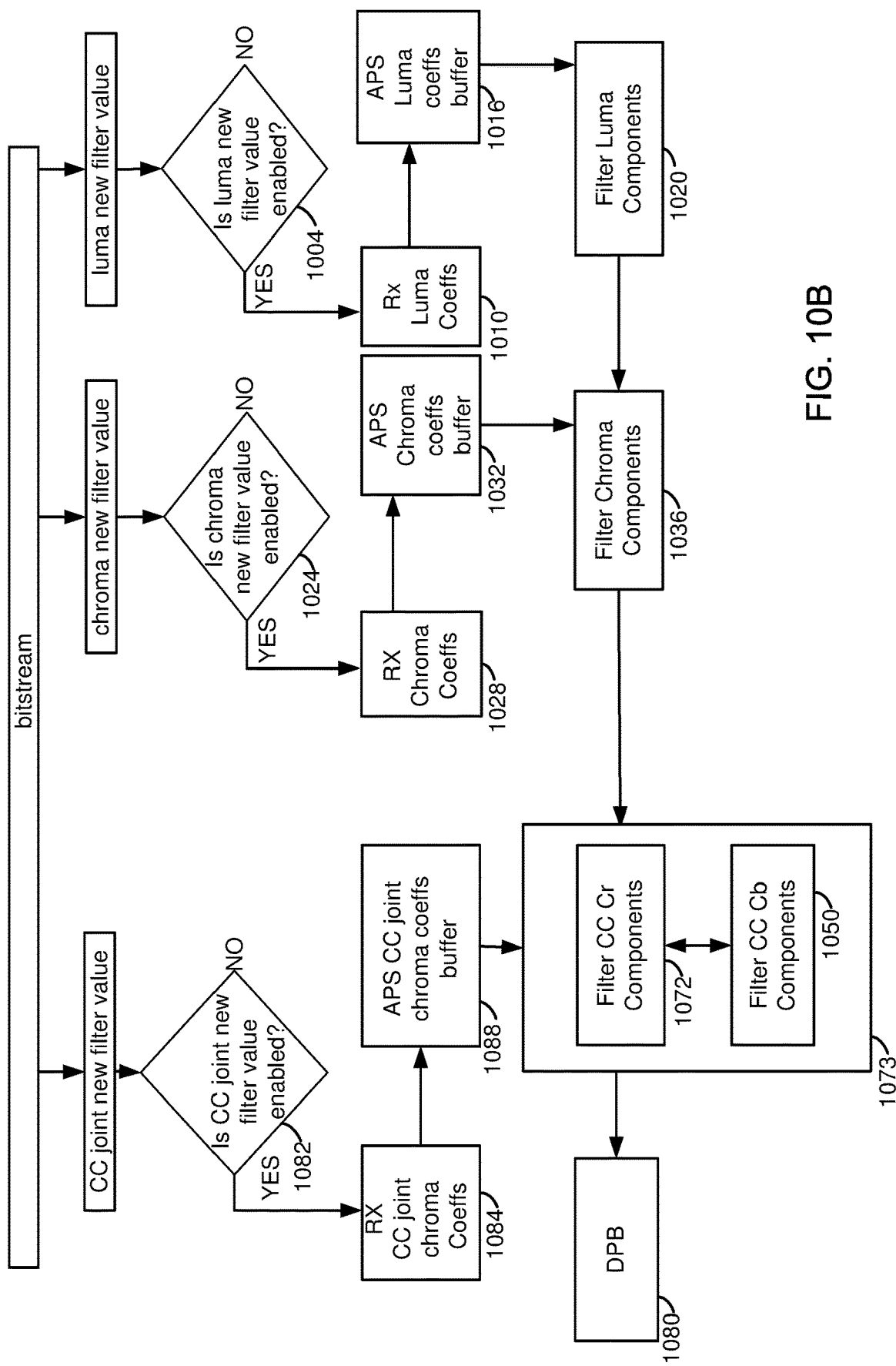
FIG. 10B is a flowchart that illustrates a process that may be performed by a video decoder device according to the techniques described in this disclosure including techniques relating to joint chroma filters.

FIG. 10B is a flowchart that illustrates a process that may be performed by the decoder device 30. In FIG. 10B, the flowchart includes other operations that are described in reference to FIG. 10B. However, there is an alternative example for the cross component Cb chroma and Cr chroma filters which is also included in FIG. 10B. In this alternative example, the one or more other parameters includes a cross component joint new filter value. The one or more processors may be configured to determine that if the cross component joint new filter value is enabled 1082, the one or more other parameters includes received cross component joint chroma coefficients 1064 that are stored in an adaptive parameter set cross component joint chroma coefficients buffer 1088. The one or more processors may be configured to filter cross component joint chroma components 1073 and of the decompressed video data as part of an adaptation loop filter process. In addition, the one or more processors may be configured to store the decoded video data in decoder picture buffer 1080 based on the filtering of the cross component joint chroma components 1073 of the decoded video data.

FIG. 11A is a flowchart that illustrates a process that may be performed by the decoder device 30. As an example, in addition to or alternatively to the operations discussed in FIG. 10A, the one or more processors may be configured to determine that if both the cross component Cr new filter value 1100 and a cross component coding tree block enable flag 1105 are both enabled, a reconstruction of a unit in a cross component Cr coding tree block 1110 should be performed.

FIG. 11B is a flowchart that illustrates a process that may be performed by the decoder device 30. As an example, in addition to or alternatively to the operations discussed in FIG. 10A, the one or more processors may be configured to determine that if both the cross component Cr new filter value 1115 and a cross component coding tree block enable flag 1120 are both enabled, a reconstruction of a unit in a cross component Cr coding tree block 1125 should be performed.

FIG. 11C is a flowchart that illustrates a process that may be performed by the decoder device 30. As an example, in addition to or alternatively to the operations discussed in FIG. 10B, the one or more processors may be configured to determine that if both the cross component joint new filter value 1130 and a cross component coding tree block enable flag 1135 are both enabled, a reconstruction of a unit in a cross component joint coding tree block 1140 should be performed.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to tangible media such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can be any of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Particular aspects of the disclosure are described below in a first set of interrelated clauses.

According to Clause 1A, there may be a method of transmitting parameters used in encoding video data comprising. The method of clause 1A, may include accessing a current unit associated with more than one adaptation parameter set, and further include generating a plurality of sets of luma coefficients of the video data associated with a plurality of luma filters in an adaptation parameter set. Moreover the method of clause 1A, may include determining a luma new filter value associated with the plurality of luma filters in the adaptation parameter set, when comparing each luma coefficient in each luma filter in the plurality of luma filters, to a first threshold value, and enabling the luma new filter value if at least one luma coefficient in each luma filter in the plurality of luma filters is not equal to the first threshold value. In addition, the method of claim 1A, may include transmitting the luma new filter value and one or more sets of luma coefficients, in the plurality of luma filters, where at least one luma coefficient in each luma filter is not equal to the first threshold value.

Clause 2A includes Clause 1A, and further includes transmitting additional one or more sets of luma coefficients in the plurality of luma filters, where all luma coefficients in each luma filter are equal to the first threshold value, as long as not all of the luma coefficients in all of the luma filters are equal to the first threshold value.

Clause 3A includes Clause 2A, and further includes wherein a unit is one of a block, tile, tile group, sub-picture, picture, slice, sub-picture, a plurality of blocks, or an area.

Clause 4A includes Clause 3A, and further includes generating a plurality of sets of chroma coefficients of the video data associated with a number of plurality of chroma filters, each chroma filter including a set of chroma coefficients, in the adaptation parameter set. In addition, Clause 4A includes determining a chroma new filter value associated with each number of plurality of chroma filters, when comparing the chroma coefficients in each of the number of the plurality of chroma filters to a second threshold value, and enabling the chroma new filter value if at least one chroma coefficient in the set of chroma coefficients for each filter in the number of the plurality of chroma filters, is not equal to the second threshold value. Moreover, Clause 4A includes transmitting the chroma new filter value, and one or more sets of chroma coefficients, in one or more filters, where at least one chroma coefficient in each filter is not equal to the second threshold value.

Clause 5A includes Clause 4A, and further includes transmitting additional one or more sets of chroma coefficients in the plurality of chroma filters, where all chroma coefficients in each chroma filter are equal to the second threshold value, as long as not all of the chroma coefficients in all of the chroma filters are equal to the second threshold value.

Clause 6A includes Clause 4A, wherein the second threshold is zero or non-zero.

Clause 7A includes Clause 1A, wherein the first threshold is zero or non-zero.

Clause 8A includes Clause 1A, and further includes generating a plurality of sets of cross component Cb chroma coefficients of the video data associated with a number of plurality of cross component Cb chroma filters, each cross component Cb chroma filter including a set of cross component Cb chroma coefficients, in the adaptation parameter set. Clause 8A further includes determining a cross component Cb chroma new filter value associated with each number of cross component Cb chroma filters, when comparing the cross component Cb chroma coefficients in each of the number of cross component Cb chroma filters to a third threshold value, and enabling the cross component Cb chroma new filter value if at least one cross component Cb chroma coefficient for each filter in the number of cross component Cb chroma filters, is not equal to the third threshold value. In addition, Clause 8A includes transmitting the cross component Cb chroma new filter value, and one or more sets of cross component Cb chroma coefficients, in one or more cross component Cb chroma filters in the number of cross component Cb chroma filters, not equal to the third threshold value.

Clause 9A. includes clause 8A, and further includes transmitting one or more sets of cross component Cb chroma coefficients in the plurality of cross component Cb chroma filters, where all cross component Cb chroma coefficients in each cross component Cb chroma filter is equal to the third threshold value, as long as not all of the cross component Cb chroma coefficients in all of the cross component Cb chroma filters are equal to the third threshold value.

Clause 10A includes Clause 8aA, wherein the third threshold is zero or non-zero.

Clause 11A includes clause 8A, and further includes wherein if the cross component Cb chroma new filter value in the adaptation parameter set is disabled, an adaptation parameter set identification (APS ID) is incremented and a different unit associated with a different adaptation parameter set is accessed.

Clause 12A includes clause 8A, and further includes wherein if the cross component Cb chroma new filter value in the adaptation parameter set is enabled, a cost function on the accessed unit is calculated based on a Cb chroma filter with a filter index in the adaptation parameter set.

Clause 13A includes clause 1A, further including generating a plurality of sets of cross component Cr chroma coefficients of the video data associated with a number of cross component Cr chroma filters, each cross component Cr chroma filter including a set of cross component Cr chroma coefficients, in the adaptation parameter set, and determining a cross component Cr chroma new filter value associated with each number of cross component Cr chroma filters, when comparing the cross component Cr chroma coefficients in each of the number of cross component Cr chroma filters to a fourth threshold value. Clause 13A further includes enabling the cross component Cr chroma new filter value if at least one cross component Cr chroma coefficient for each filer, in the number of cross component Cr chroma filters, is not equal to the fourth threshold value, and transmitting the cross component Cr chroma new filter value, and one or more sets of cross component Cr chroma coefficients, in one or more cross component Cr chroma filters in the number of cross component Cr chroma filters, not equal to the fourth threshold value.

Clause 14A includes clause 13A, and further includes transmitting one or more sets of cross component Cr chroma coefficients in the plurality of cross component Cr chroma filters, where all cross component Cr chroma coefficients in each cross component Cr chroma filter is equal to the fourth threshold value, as long as not all of the cross component Cr chroma coefficients in all of the cross component Cr chroma filters are equal to the fourth threshold value.

Clause 15A includes clause 13A, wherein the fourth threshold is zero or non-zero.

Clause 16A includes clause 13A, further including determining if the cross component Cr chroma new filter value in the adaptation parameter set is disabled, an adaptation parameter set identification (APS ID) is incremented and a different unit associated with a different adaptation parameter set is accessed.

Clause 17A includes clause 13A, and further includes determining if the cross component Cr chroma new filter value in the adaptation parameter set is enabled, a cost function on the accessed unit is calculated based on a Cr chroma filter with a filter index in the adaptation parameter set.

Clause 18A includes clause 13A, wherein a unit is a slice, and the slice is referencing cross-component chroma coefficients in the adaptation parameter set, the cross-component chroma coefficients are transmitted in the bitstream.

Clause 19A includes clause 1A, wherein the luma new filter value and at least one other new filter value are not enabled during the accessing of the current unit at the same time.

Clause 20A includes clause 19A, wherein the at least one other new filter value is one or more of the following: a chroma new filter value, a cross component Cb chroma new filter value, or a cross component Cr chroma new filter value.

Clause 21A includes clause 19A, further includes not transmitting filter coefficients associated with the at least one other new filter value.

Clause 22A includes clause 1A, and further includes generating a plurality of sets of cross component joint chroma coefficients of the video data associated with a number of plurality of cross component joint chroma filters, each cross component joint chroma filter including a set of cross component joint chroma coefficients, in the adaptation parameter set. In addition, clause 22A includes determining a cross component joint chroma new filter value associated with each number of plurality of cross component joint chroma filters, when comparing the cross component joint chroma coefficients, in each of the number of the plurality of cross component joint chroma filters, to a fifth threshold value. Moreover, clause 22A, includes enabling the cross component joint chroma new filter value if at least one cross component joint chroma coefficient for each filter in the number of cross component joint chroma filters, is not equal to the fifth threshold value, and transmitting the cross component joint chroma new filter value, and one or more sets of cross component joint chroma coefficients, in one or more number of the plurality of cross component joint filters, not equal to the fifth threshold value.

23A The method of claim 22A, further comprising transmitting one or more sets of cross component joint chroma coefficients in the plurality of cross component joint chroma filters, where all cross component joint chroma coefficients in each cross component joint chroma filter is equal to the fifth threshold value, as long as not all of the cross component joint chroma coefficients in all of the cross component joint chroma filters are equal to the fifth threshold value.

Clause 24A includes clause 22A, and further includes if a cross component joint new filter value in the adaptation parameter set is disabled, an adaptation parameter set identification (APS ID) is incremented and a different unit associated with a different adaptation parameter set is accessed.

Clause 25A includes clause 25A, and further incudes if a cross component joint new filter value in the adaptation parameter set is enabled, a cost function on the accessed unit is calculated based on a joint chroma filter with a filter index in the adaptation parameter set.

Clause 1B is directed at an encoder device for transmitting parameters used in encoding video data including, a memory configured to store video data, and one or more processors, coupled to the memory. The one or more processors are configured to access a current unit associated with more than one adaptation parameter set, generate a plurality of sets of luma coefficients of the video data associated with a plurality of luma filters in an adaptation parameter set, and determine a luma new filter value associated with the plurality of luma filters in the adaptation parameter set, when comparing each luma coefficient in each luma filter in the plurality of luma filters, to a first threshold value. The one or more processors are further configured to enable the luma new filter value if at least one luma coefficient in each luma filter in the plurality of luma filters is not equal to the first threshold value, and transmit the luma new filter value and one or more sets of luma coefficients, in the plurality of luma filters, where at least one luma coefficient in each luma filter is not equal to the first threshold value.

Clause 2B includes the device of clause 1B and further includes that the one or more processors are configured to transmit additional one or more sets of luma coefficients in the plurality of luma filters, where all luma coefficients in each luma filter are equal to the first threshold value, as long as not all of the luma coefficients in all of the luma filters are equal to the first threshold value.

Clause 3B includes the device of clause 1B, where a unit is one of a block, tile, tile group, sub-picture, picture, slice, sub-picture, a plurality of blocks, or an area. Clause 4B includes the device of claim 1B, further includes that the one or more processors are configured to generate a plurality of sets of chroma coefficients of the video data associated with a number of plurality of chroma filters, each chroma filter including a set of chroma coefficients, in the adaptation parameter set. In addition, the one or more processors are configured to determine a chroma new filter value associated with each number of plurality of chroma filters, when comparing the chroma coefficients in each of the number of the plurality of chroma filters to a second threshold value. Moreover, the one or more processors are configured to enable the chroma new filter value if at least one chroma coefficient in the set of chroma coefficients for each filter in the number of the plurality of chroma filters, is not equal to the second threshold value; and transmit the chroma new filter value, and one or more sets of chroma coefficients, in one or more filters, where at least one chroma coefficient in each filter is not equal to the second threshold value.

Clause 5B includes the device of clause 4B, and further includes that the one or more processors are configured to transmit additional one or more sets of chroma coefficients in the plurality of chroma filters, where all chroma coefficients in each chroma filter are equal to the second threshold value, as long as not all of the chroma coefficients in all of the chroma filters are equal to the second threshold value.

Clause 6B includes the device of clause 4B, wherein the second threshold is zero or non-zero.

Clause 7B includes the device of clause 1B, wherein the first threshold is zero or non-zero.

Clause 8B includes the device of clause 1B, and further includes that the one or more processors are configured to generate a plurality of sets of cross component Cb chroma coefficients of the video data associated with a number of plurality of cross component Cb chroma filters, each cross component Cb chroma filter including a set of cross component Cb chroma coefficients, in the adaptation parameter set. In addition, clause 8B further includes that the one or more processors are configured to determine a cross component Cb chroma new filter value associated with each number of cross component Cb chroma filters, when comparing the cross component Cb chroma coefficients in each of the number of cross component Cb chroma filters to a third threshold value. The one or more processors are configured to enable the cross component Cb chroma new filter value if at least one cross component Cb chroma coefficient for each filter in the number of cross component Cb chroma filters, is not equal to the third threshold value. In addition, the one or more processors are configured to transmit the cross component Cb chroma new filter value, and one or more sets of cross component Cb chroma coefficients, in one or more cross component Cb chroma filters in the number of cross component Cb chroma filters, not equal to the third threshold value.

Clause 9B includes the device of clause 8B, further includes that the one or more processors are configured to transmit one or more sets of cross component Cb chroma coefficients in the plurality of cross component Cb chroma filters, where all cross component Cb chroma coefficients in each cross component Cb chroma filter is equal to the third threshold value, as long as not all of the cross component Cb chroma coefficients in all of the cross component Cb chroma filters are equal to the third threshold value.

Clause 10 includes the device of clause 8B, wherein the third threshold is zero or non-zero.

Clause 11B includes the device of clause 8B, and further includes if the cross component Cb chroma new filter value in the adaptation parameter set is disabled, the adaptation parameter set identification (APS ID) is incremented and a different unit associated with a different adaptation parameter set is accessed.

Clause 12B incudes the device of clause 8B, further comprising if the cross component Cb chroma new filter value in the adaptation parameter set is enabled, a cost function on the accessed unit is calculated based on a Cb chroma filter with a filter index in the adaptation parameter set.

Clause 13B includes the device of clause 8B, further includes that the one or more processors are configured to generate a plurality of sets of cross component Cr chroma coefficients of the video data associated with a number of cross component Cr chroma filters, each cross component Cr chroma filter includes a set of cross component Cr chroma coefficients, in the adaptation parameter set. In addition, the one or more processors are configured to determine a cross component Cr chroma new filter value associated with each number of cross component Cr chroma filters, when comparing the cross component Cr chroma coefficients in each of the number of cross component Cr chroma filters to a fourth threshold value. Moreover, the one or more processors are configured to enable the cross component Cr chroma new filter value if at least one cross component Cr chroma coefficient for each filer, in the number of cross component Cr chroma filters, is not equal to the fourth threshold value, and further configured to transmit the cross component Cr chroma new filter value, and one or more sets of cross component Cr chroma coefficients, in one or more cross component Cr chroma filters in the number of cross component Cr chroma filters, not equal to the fourth threshold value.

Clause 14B includes the device of clause 13B, and further includes that the one or more processors are configured to transmit one or more sets of cross component Cr chroma coefficients in the plurality of cross component Cr chroma filters, where all cross component Cr chroma coefficients in each cross component Cr chroma filter is equal to the fourth threshold value, as long as not all of the cross component Cr chroma coefficients in all of the cross component Cr chroma filters are equal to the fourth threshold value.

Clause 15B includes the device of clause 13B, wherein the fourth threshold is zero or non-zero.

Clause 16B includes the device of clause 13B, and further includes that the one or more processors are configured to determine if the cross component Cb chroma new filter value in the adaptation parameter set is disabled, an adaptation parameter set identification (APS ID) is incremented and a different unit associated with a different adaptation parameter set is accessed.

Clause 17B includes the device of clause 13B, and further includes that the one or more processors are configured to determine if the cross component Cb chroma new filter value in the adaptation parameter set is enabled, a cost function on the accessed unit is calculated based on a Cb chroma filter with a filter index in the adaptation parameter set.

Clause 18B includes the device of clause 13B, wherein a unit is a slice, and the slice is referencing cross-component chroma coefficients in the adaptation parameter set, the cross-component chroma coefficients are transmitted in the bitstream.

Clause 19B includes the device of clause 1B, wherein the luma new filter value and at least one other new filter value are not enabled during the access of the current unit at the same time.

Clause 20B includes the device of clause 19B, wherein the at least one other new filter value is one or more of the following: a chroma new filter value, a cross component Cb chroma new filter value, or a cross component Cr chroma new filter value.

Clause 21B includes the device of clause 19B, and further includes that the one or more processors are configured not to transmit filter coefficients associated with the at least one other new filter value.

Clause 22B includes the device of clause 1B, and further includes that the one or more processors are configured to generate a plurality of sets of cross component joint chroma coefficients of the video data associated with a number of plurality of cross component joint chroma filters, each cross component joint chroma filter includes a set of cross component joint chroma coefficients, in the adaptation parameter set. In addition, the one or more processors are configured to determine a cross component joint chroma new filter value associated with each number of plurality of cross component joint chroma filters, when comparing the cross component joint chroma coefficients, in each of the number of the plurality of cross component joint chroma filters, to a fifth threshold value. Moreover, the one or more processors are configured to enable the cross component joint chroma new filter value if at least one cross component joint chroma coefficient for each filter in the number of cross component joint chroma filters, is not equal to the fifth threshold value, and the one or more processors are configured to transmit the cross component joint chroma new filter value, and one or more sets of cross component joint chroma coefficients, in one or more number of the plurality of cross component joint filters, not equal to the fifth threshold value.

Clause 23B includes the device of clause 22B, and further includes that the one or more processors are configured to transmit one or more sets of cross component joint chroma coefficients in the plurality of cross component joint chroma filters, where all cross component joint chroma coefficients in each cross component joint chroma filter is equal to the fifth threshold value, as long as not all of the cross component joint chroma coefficients in all of the cross component joint chroma filters are equal to the fifth threshold value.

Clause 24B includes the device of clause 22B, and further includes that the one or more processors are configured to determine if the cross component joint new filter value in the adaptation parameter set is disabled, an adaptation parameter set identification (APS ID) is incremented and a different unit associated with a different adaptation parameter set is accessed.

Clause 25B includes the device of clause 22B, and further includes that the one or more processors are configured to determine if the cross component joint new filter value in the adaptation parameter set is enabled, a cost function on the accessed unit is calculated based on a joint chroma filter with a filter index in the adaptation parameter set.

Clause 1C includes receiving a bitstream that includes a luma new filter value, a chroma new filter value, a cross component Cb chroma new filter value, a cross component Cr chroma new filter value, compressed video data, with the luma new filter value, the chroma new filter value, the cross component Cb chroma new filter value, the cross component Cr chroma new filter value having been transmitted subject to a joint constraint that not all of the luma new filter value, the chroma new filter value, the cross component Cb chroma new filter value, the cross component Cr chroma new filter value are equal to zero in bitstream within a same frame. Note, zero indicates that a new filter value is disabled. In implementations where a one indicates that a new filter value is disabled, all four new filter values may not equal one in a bitstream within a same frame.

Clause 2C includes clause 1C, and further includes decompressing the compressed video data to generate decompressed video data. Clause 2C further includes determining that if the luma new filter value is enabled, the one or more other parameters includes received luma coefficients that are stored in an adaptive parameter set luma coefficients buffer. Clause 2C also further includes filtering luma components of the decompressed video data as part of an adaptation loop filter process, to generate decoded video data, and storing the decoded video data in decoder picture buffer based on the filtering of the luma components of the decoded video data.

Clause 3C includes clause 1C, further includes determining that if the chroma new filter value is enabled, chroma coefficients are received and stored in an adaptive parameter set chroma coefficients buffer. Clause 3C further includes filtering chroma components of the decompressed video data as part of an adaptation loop filter process, and further includes storing the decoded video data in decoder picture buffer based on the filtering of the chroma components of the decoded video data.

Clause 4C includes the clause 3C, and further includes determining that if the cross component Cb chroma new filter value is enabled, Cb chroma coefficients are received and stored in an adaptive parameter set cross component Cb chroma coefficients buffer. Clause 4C also includes filtering cross component Cb chroma components of the decompressed video data as part of the adaptation loop filter process, and further includes storing the decoded video data in decoder picture buffer based on the filtering of the cross component Cb chroma components of the decoded video data.

Clause 5C includes the clause 3C, and further includes determining that if the cross component Cr chroma new filter value is enabled, Cr chroma coefficients are received and stored in the adaptive parameter set cross component Cr chroma coefficients buffer. Clause 5C also includes filtering cross component Cr chroma components of the decompressed video data as part of the adaptation loop filter process. In addition, Clause 5C further includes storing the decoded video data in decoder picture buffer based on the filtering of the cross component Cr chroma components of the decoded video data.

Clause 6C includes the clause 3C includes the determining that if the cross component joint new filter value is enabled, joint chroma coefficients are received and stored in an adaptive parameter set cross component joint chroma coefficients buffer. Clause 6C also includes filtering cross component joint chroma components and of the decompressed video data as part of the adaptation loop filter process. In addition, clause 6C includes storing the decoded video data in decoder picture buffer based on the filtering of the cross component joint chroma components of the decoded video data.

Clause 1D is directed at a device that includes a memory configured to store compressed video data, and one or more processors. The one or more processors are configured to receive a bitstream that includes a luma new filter value, a chroma new filter value, a cross component Cb chroma new filter value, a cross component Cr chroma new filter value, the compressed video data, wherein the luma new filter value, the chroma new filter value, the cross component Cb chroma new filter value, the cross component Cr chroma new filter value having been transmitted subject to a joint constraint that not all of the luma new filter value, the chroma new filter value, the cross component Cb chroma new filter value, the cross component Cr chroma new filter value are equal to zero in a bitstream within a same frame. Note, zero indicates that a new filter value is disabled. In implementations where a one indicates that a new filter value is disabled, all four new filter values may not equal one in a bitstream within a same frame.

Clause 2D includes the device of clause 1D, wherein the one or more processors are configured to decompress the compressed video data to generate decompressed video data.

In addition, the one or more processors are configured to determine that if the luma new filter value is enabled, the one or more other parameters includes received luma coefficients that are stored in an adaptive parameter set luma coefficients buffer. Moreover, the one or more processors are configured to filter luma components of the decompressed video data as part of an adaptation loop filter process, to generate decoded video data. The one or more processors are also configured to store the decoded video data in decoder picture buffer based on the luma components of the decoded video data having been filtered.

Clause 3D includes the device of clause 2D, wherein the one or more processors are configured to determine that if the chroma new filter value is enabled, chroma coefficients are received and stored in an adaptive parameter set chroma coefficients buffer. In addition, the one or more processors are configured to filter chroma components of the decompressed video data as part of an adaptation loop filter process. Moreover, the one or more processors are configured to store the decoded video data in decoder picture buffer based on the chroma components of the decoded video data having been filtered.

Clause 4D includes the device of clause 3D, wherein the one or more processors are configured to determine that if the cross component Cb chroma new filter value is enabled, Cb chroma coefficients are received and stored in an adaptive parameter set cross component Cb chroma coefficients buffer. Moreover, the one or more processors are configured to filter cross component Cb chroma components of the decompressed video data as part of the adaptation loop filter process. In addition, the one or more processors are configured to store the decoded video data in decoder picture buffer based on the cross component Cb chroma components of the decoded video data having been filtered.

Clause 5D includes the device of clause 3D, wherein the one or more processors are configured to determine that if the cross component Cr chroma new filter value is enabled, Cr chroma coefficients are received and stored in an adaptive parameter set cross component Cr chroma coefficients buffer. In addition, the one or more processors are configured to filter cross component Cr chroma components of the decompressed video data as part of the adaptation loop filter process. Moreover, the one or more processors are configured to store the decoded video data in decoder picture buffer based on the cross component Cr chroma components of the decoded video data having been filtered.

Clause 5D includes the device of The device of clause 3D, wherein the one or more processors are configured to determine that if the cross component joint new filter value is enabled, joint chroma coefficients are received and stored in an adaptive parameter set cross component joint chroma coefficients buffer. In addition, the one or more processors are configured to filter cross component joint chroma components of the decompressed video data as part of the adaptation loop filter process. Moreover, the one or more processors are configured to store the decoded video data in decoder picture buffer based on the cross component joint chroma components of the decoded video data having been filtered.

The previous description of the disclosed examples is provided to enable a person skilled in the art to make or use the disclosed examples. Various modifications to these examples will be readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the claims of the corresponding non-provisional application.

The invention claimed is:

1. A method of encoding video data comprising:
associating a luma new filter value, with a plurality of luma filters, in an adaptation parameter set, wherein the luma new filter value indicates whether at least one luma filter is present in an adaptive parameter set (APS);
associating a chroma new filter value, with a plurality of chroma filters, in the adaptation parameter set, wherein the chroma new filter value indicates whether at least one chroma filter is present in the APS;
associating a cross component Cb new filter value, with a plurality of chroma component Cb chroma filters, in the adaptation parameter set, wherein the cross component Cb new filter value indicates whether at least one cross component Cb filter is present in the APS;
associating a cross component Cr new filter value, with a plurality of chroma component Cr chroma filters, in the adaptation parameter set, wherein the cross component Cr new filter value indicates whether at least one cross component Cr filter is present in the APS;
setting a joint constraint, on the luma new filter value, the chroma new filter value, the cross component Cb new filter value, and the cross component Cr new filter value, such that each of the luma new filter value, the chroma new filter value, the cross component Cb new filter value, and the cross component Cr new filter value are not disabled in a unit associated with an adaptation parameter set having a first adaptation parameter set identification (APS ID);
determining a cross component Cr chroma filter, in the plurality of Cr chroma filters, for a chroma coding tree block (CTB), wherein if the cross component Cr new filter value in the adaptation parameter set is disabled, the first adaptation parameter set identification (APS ID) is incremented and a second unit associated with a second adaptation parameter set identification ID associated with a different adaptation parameter set is accessed; and
generating a bitstream, within a video frame, that includes the luma new filter value, the chroma new filter value, the cross component Cb new filter value, and cross component Cr new filter value in the unit associated with the adaptation parameter based on the joint constraint.

2. The method of claim 1, further comprising:
initializing a video encoder with the of luma new filter value equal to disabled, the chroma new filter value equal to disabled, the chroma cross component Cb filter value equal to disabled, the chroma cross component Cr filter value equal to disabled;
during operation of the video encoder changing at least one of the luma new filter value, the chroma filter value, the cross component Cb new filter value, and the cross component Cr new filter value to be enabled to satisfy the joint constraint.

3. The method of claim 1, further comprising:
enabling the luma new filter value if at least one luma coefficient in each luma filter in the plurality of luma filters is not equal to the first threshold value;
enabling the chroma new filter value if at least one chroma coefficient in each chroma filter in the plurality of chroma filters is not equal to the second threshold value;
enabling the cross component Cb new filter value if at least one cross component Cb coefficient in each cross component Cb new filter in the plurality of cross component Cb filters is not equal to the third threshold value; and
enabling the cross component Cr new filter value if at least one cross component Cr coefficient in each cross component Cr filter in the plurality of cross component Cr filters is not equal to the fourth threshold value.

4. The method of claim 3, wherein the first threshold, the second threshold, the third threshold, and the fourth threshold are zero.

5. The method of claim 1, further comprising determining a cross component Cb chroma filter, in the plurality of Cb chroma filters, for a chroma coding tree block (CTB), wherein if the cross component Cb new filter value in the adaptation parameter set is disabled, the first adaptation parameter set identification (APS ID) is incremented and a second unit associated with a second adaptation parameter set identification ID associated with a different adaptation parameter set is accessed.

6. The method of claim 1, further comprising determining one cross component Cb chroma filter, in the plurality of Cb chroma filters, for one chroma coding tree block (CTB), wherein if the cross component Cb new filter value in the adaptation parameter set is enabled, a cost function on the accessed unit is calculated based on the one cross component Cb chroma filter, in the plurality of cross component Cb chroma filters, with a filter index in the adaptation parameter set.

7. The method of claim 1, further comprising determining one cross component Cr chroma filter, in the plurality of Cr chroma filters, for one chroma coding tree block (CTB), wherein if the cross component Cr new filter value in the adaptation parameter set is enabled, a cost function on the accessed unit is calculated based on the one cross component Cr chroma filter, in the plurality of cross component Cr chroma filters, with a filter index in the adaptation parameter set.

8. A device comprising:
a memory configured to store a luma new filter value, a chroma new filter value, a cross component Cb new filter value, and a cross component Cr new filter value; and
one or more processors are configured to:
associate a luma new filter value, with a plurality of luma filters, in an adaptation parameter set, wherein the luma new filter value indicates whether at least one luma filter is present in an adaptive parameter set (APS);
associate a chroma new filter value, with a plurality of chroma filters, in the adaptation parameter set, wherein the chroma new filter value indicates whether at least one chroma filter is present in the APS;
associate a cross component Cb new filter value, with a plurality of chroma component Cb chroma filters, in the adaptation parameter set, wherein the cross component Cb new filter value indicates whether at least one cross component Cb filter is present in the APS;
associate a cross component Cr new filter value, with a plurality of chroma component Cr chroma filters, in the adaptation parameter set, wherein the cross component Cr new filter value indicates whether at least one cross component Cr filter is present in the APS;
set a joint constraint on the luma new filter value, the chroma new filter value, the cross component Cb new filter value, and the cross component Cr new filter value, such that each of the luma new filter value, the chroma new filter value, the cross component Cb new filter value, and the cross component Cr new filter value are not disabled in a unit associated with an adaptation parameter set having a first adaptation parameter set identification (APS ID);
determine a cross component Cr chroma filter, in the plurality of Cr chroma filters, for a chroma coding tree block (CTB), wherein if the cross component Cr new filter value in the adaptation parameter set is disabled, the first adaptation parameter set identification (APS ID) is incremented and a second unit associated with a second adaptation parameter set identification ID associated with a different adaptation parameter set is accessed; and
generate a bitstream that includes the luma new filter value, the chroma new filter value, the cross component Cb new filter value, and cross component Cr new filter value in the unit associated with the adaptation parameter based on the joint constraint.

9. The device of claim 8, wherein the one or more processors are further configured to:
initialize a video encoder with the of luma new filter value equal to disabled, the chroma new filter value equal to disabled, the chroma cross component Cb filter value equal to disabled, the chroma cross component Cr filter value equal to disabled;
during operation of the video encoder changing at least one of the luma new filter value, the chroma filter value, the cross component Cb new filter value, and the cross component Cr new filter value to be enabled to satisfy the joint constraint.

10. The device of claim 8, wherein the one or more processors are further configured to:
enable the luma new filter value if at least one luma coefficient in each luma filter in the plurality of luma filters is not equal to the first threshold value;
enable the chroma new filter value if at least one chroma coefficient in each chroma filter in the plurality of chroma filters is not equal to the second threshold value;
enable the cross component Cb new filter value if at least one cross component Cb coefficient in each cross component Cb new filter in the plurality of cross component Cb filters is not equal to the third threshold value; and
enable the cross component Cr new filter value if at least one cross component Cr coefficient in each cross component Cr filter in the plurality of cross component Cr filters is not equal to the fourth threshold value.

11. The device of claim 10, wherein the first threshold, the second threshold, the third threshold, and the fourth threshold are zero.

12. The device of claim 8, wherein the one or more processors are further configured to determine a cross component Cb chroma filter, in the plurality of Cb chroma filters, for a chroma coding tree block (CTB), wherein if the cross component Cb new filter value in the adaptation parameter set is disabled, the first adaptation parameter set identification (APS ID) is incremented and a second unit associated with a second adaptation parameter set identification ID associated with a different adaptation parameter set is accessed.

13. The device of claim 8, wherein the one or more processors are further configured to determine one cross component Cb chroma filter, in the plurality of Cb chroma filters, for one chroma coding tree block (CTB), wherein if the cross component Cb new filter value in the adaptation parameter set is enabled, a cost function on the accessed unit is calculated based on the one cross component Cb chroma filter, in the plurality of cross component Cb chroma filters, with a filter index in the adaptation parameter set.

14. The device of claim 8, wherein the one or more processors are further configured to determine one cross component Cr chroma filter, in the plurality of Cr chroma filters, for one chroma coding tree block (CTB), wherein if the cross component Cr new filter value in the adaptation parameter set is enabled, a cost function on the accessed unit is calculated based on the one cross component Cr chroma filter, in the plurality of cross component Cr chroma filters, with a filter index in the adaptation parameter set.

15. A device comprising:
a memory configured to store compressed video data; and
one or more processors, coupled to the memory, configured to:
receive a bitstream that includes a luma new filter value, a chroma new filter value, a cross component Cb chroma new filter value, a cross component Cr chroma new filter value, the compressed video data, and wherein the luma new filter value, the chroma new filter value, the cross component Cb chroma new filter value, the cross component Cr chroma new filter value having been transmitted subject to a joint constraint that not all of the luma new filter value, the chroma new filter value, the cross component Cb chroma new filter value, the cross component Cr chroma new filter value are equal to disabled in a bitstream within a same frame;
decompress the compressed video data to generate decompressed video data;
determine that if the luma new filter value is enabled, the one or more other parameters includes received luma coefficients that are stored in the memory;
filter luma components of the decompressed video data as part of an adaptation loop filter process, to generate decoded video data; and
store the decoded video data in decoder picture buffer based on the luma components of the decoded video data having been filtered.

16. A device comprising:
a memory configured to store compressed video data; and
one or more processors, coupled to the memory, configured to:
receive a bitstream that includes a luma new filter value, a chroma new filter value, a cross component Cb chroma new filter value, a cross component Cr chroma new filter value, the compressed video data, and wherein the luma new filter value, the chroma new filter value, the cross component Cb chroma new filter value, the cross component Cr chroma new filter value having been transmitted subject to a joint constraint that not all of the luma new filter value, the chroma new filter value, the cross component Cb chroma new filter value, the cross component Cr chroma new filter value are equal to disabled in a bitstream within a same frame;
determine that if the chroma new filter value is enabled, chroma coefficients are received and stored in the memory;
filter chroma components of the decompressed video data as part of an adaptation loop filter process; and
store the decoded video data in decoder picture buffer based on the chroma components of the decoded video data having been filtered.

17. A device comprising:
a memory configured to store compressed video data; and
one or more processors, coupled to the memory, configured to:
receive a bitstream that includes a luma new filter value, a chroma new filter value, a cross component Cb chroma new filter value, a cross component Cr chroma new filter value, the compressed video data, and wherein the luma new filter value, the chroma new filter value, the cross component Cb chroma new filter value, the cross component Cr chroma new filter value having been transmitted subject to a joint constraint that not all of the luma new filter value, the chroma new filter value, the cross component Cb chroma new filter value, the cross component Cr chroma new filter value are equal to disabled in a bitstream within a same frame;
determine that if the cross component Cb chroma new filter value is enabled, cross component Cb chroma coefficients are received and stored in the memory;
filter cross component Cb chroma components of the decompressed video data as part of an adaptation loop filter process; and
store the decoded video data in decoder picture buffer based on the cross component Cb chroma components of the decoded video data having been filtered.

18. A device comprising:
a memory configured to store compressed video data; and
one or more processors, coupled to the memory, configured to:
receive a bitstream that includes a luma new filter value, a chroma new filter value, a cross component Cb chroma new filter value, a cross component Cr chroma new filter value, the compressed video data, and wherein the luma new filter value, the chroma new filter value, the cross component Cb chroma new filter value, the cross component Cr chroma new filter value having been transmitted subject to a joint constraint that not all of the luma new filter value, the chroma new filter value, the cross component Cb chroma new filter value, the cross component Cr chroma new filter value are equal to disabled in a bitstream within a same frame;
determine that if the cross component Cr chroma new filter value is enabled, cross component Cr chroma coefficients are received and stored in the memory;
filter cross component Cr chroma components of the decompressed video data as part of an adaptation loop filter process; and
store the decoded video data in decoder picture buffer based on the cross component Cr chroma components of the decoded video data having been filtered.

* * * * *